(12) United States Patent
Sako et al.

(10) Patent No.: US 7,221,636 B2
(45) Date of Patent: May 22, 2007

(54) DATA RECORDING APPARATUS AND ASSOCIATED METHOD OF IMPARTING DATA TO A RECORDING MEDIUM BY IRRADIATING A REFLECTIVITY LAYER OF THE MEDIUM

(75) Inventors: Yoichiro Sako, Tokyo (JP); Tatsuya Inokuchi, Tokyo (JP); Tomihiro Nakagawa, Kanagawa (JP); Yoriaki Kanada, Kanagawa (JP); Yoshinobu Usui, Kanagawa (JP); Akiya Saito, Kanagawa (JP)

(73) Assignees: Sony Corporation, Tokyo (JP); Sony Disc & Digital Solutions Inc., Tokyo (JP)

( * ) Notice: Subject to any disclaimer, the term of this patent is extended or adjusted under 35 U.S.C. 154(b) by 714 days.

(21) Appl. No.: 10/309,248

(22) Filed: Dec. 4, 2002

(65) Prior Publication Data

US 2003/0133006 A1    Jul. 17, 2003

(30) Foreign Application Priority Data

Dec. 5, 2001    (JP) .............................. 2001-371662

(51) Int. Cl.
*G11B 7/00* (2006.01)

(52) U.S. Cl. .................................. 369/59.25

(58) Field of Classification Search ............. 369/59.25
See application file for complete search history.

(56) References Cited

U.S. PATENT DOCUMENTS

| | | | | |
|---|---|---|---|---|
| 5,541,904 A * | 7/1996 | Fite et al. ................. | 369/53.21 |
| 5,703,868 A * | 12/1997 | Kobayashi et al. ......... | 369/286 |
| 5,856,048 A * | 1/1999 | Tahara et al. ................ | 430/1 |
| 5,946,286 A * | 8/1999 | Bahns ...................... | 369/275.3 |
| 6,160,779 A * | 12/2000 | Usui et al. ............... | 369/59.23 |
| 6,590,846 B2 * | 7/2003 | Tosaki et al. ............. | 369/53.21 |
| 6,765,852 B1 * | 7/2004 | Van Den Enden et al. ...... | 369/53.21 |
| 6,810,004 B1 * | 10/2004 | Sako ........................ | 369/275.4 |
| 6,963,529 B1 * | 11/2005 | Kobayashi et al. ...... | 369/59.24 |
| 2002/0026602 A1 * | 2/2002 | Edelkind ....................... | 714/6 |

* cited by examiner

*Primary Examiner*—Gautam R. Patel
(74) *Attorney, Agent, or Firm*—Oblon, Spivak, McClelland, Maier & Neustadt, P.C.

(57) ABSTRACT

A method is provided for recording medium having a substrate on which first data and second data are recorded as a protrusion/depression pattern and a reflective layer that is provided on a surface having the protrusion/depression pattern. Laser light is radiated to the reflective layer to change the protrusion/depression pattern of the second data, and third data used for identifying the recording medium is additionally recorded at a predetermined position on the recording medium.

1 Claim, 17 Drawing Sheets

|  | | P | Q | R | S | T | U | V | W |
|---|---|---|---|---|---|---|---|---|---|
| FIG. 10A | 0x47 | 0 | (1) | 0 | 0 | 0 | 1 | 1 | 1 |
| | 0x07 | 0 | (0) | 0 | 0 | 0 | 1 | 1 | 1 |
| FIG. 10B | 0x40 | 0 | (1) | 0 | 0 | 0 | 0 | 0 | 0 |
| | 0x00 | 0 | (0) | 0 | 0 | 0 | 0 | 0 | 0 |

DATA RECORDING APPARATUS AND ASSOCIATED METHOD OF IMPARTING DATA TO A RECORDING MEDIUM BY IRRADIATING A REFLECTIVITY LAYER OF THE MEDIUM

BACKGROUND OF THE INVENTION

1. Field of the Invention

The present invention relates to recording media, recording methods and recording apparatuses for the recording media, and manufacturing apparatuses. More particularly, the present invention relates to a recording medium onto which data used for identification of the recording medium is additionally recorded, a recording method and a recording apparatus for the recording medium, and a manufacturing apparatus.

2. Description of the Related Art

The standards of compact discs (CDs) widely available today are referred to as "compact disc digital audio (CD-DA)" standards, which are based on specifications described in a book standard (Red Book). In accordance with the book, various formats are standardized to constitute a so-called "CD family". In the description below, the term "CD" generally refers to discs in various formats included in the CD family.

It has been proposed that material for a reflective layer of a disc is selected and data is recorded by radiating a laser beam onto the reflective layer. Such recording onto the reflective layer allows for recording of, for example, identification information for identifying each disc. To record identification information, a Q-channel subcode can be used in a CD format.

In the CD standard, modes 1 to 5 are already designated for a subcode. Mode 1 is considered to be the most important and is used to record, as a time code, address information indicating a position on a disc. Modes 2 and 3 are used for recording a copyright code and the like.

In the CD standard, it is specified that mode-1 data is required to be in 9 frames or more out of 10 consecutive frames, and mode-2 or -3 data is required to be in at least one frame out of 100 consecutive frames. In other words, only the ratio of data is defined but no recording position is defined. In conventional CDs in which subcodes are recorded at the same time by mastering, only specifying the ratio of data has not caused significant inconvenience. However, since a method for recording an identification signal onto the reflective film is a method for additional recording, the method has a problem in which additional recording is difficult when a recording position is not specified.

SUMMARY OF THE INVENTION

It is therefore an object of the present invention to provide a recording method for a recording medium that resolves the above-mentioned problem.

It is another object of the present invention to provide a manufacturing apparatus that resolves the above-mentioned problem.

It is further an object of the present invention to provide a recording apparatus for a recording medium that resolves the above-mentioned problem.

It is yet further an object of the present invention to provide a recording medium that resolves the above-mentioned problem.

According to the present invention, there is provided a recording method for a recording medium. The recording medium has a substrate on which first data and second data are recorded as a protrusion/depression pattern in advance and a reflective layer that is provided on a surface having the protrusion/depression pattern. The recording method includes changing the protrusion/depression pattern of the second data by irradiating the reflective layer with laser light; and additionally recording third data, which is used for identifying the recording medium, at a predetermined position on the recording medium.

According to the present invention, there is provided a manufacturing apparatus. The manufacturing apparatus includes a laser light source, a modulator, an optical head, and a signal generator. In accordance with a supplied signal, the modulator modulates laser light emitted from the laser light source. The optical head has an objective lens for radiating the laser light modulated by the modulator to a glass base-plate to which a photoresist is applied. The signal generator generates first sub-data and second sub-data that is used for identification and selectively supplies the first sub-data and the second sub-data to the modulator in conjunction with main data. The signal generator generates the first sub-data so that the ratio of the first sub-data is equal to a predetermined ratio or more.

According to the present invention, there is provided a recording apparatus for a recording medium. The recording medium has a substrate on which first data and second data are recorded as a protrusion/depression pattern in advance and a reflective layer that is provided on a surface having the protrusion/depression pattern. The recording apparatus includes a head unit, a detector, and a recording controller. The head unit irradiates the recording medium with laser light. The detector detects the second data that is read from the recording medium by the head unit. The recording controller controls the head unit in accordance with a result detected by the detector, to additionally record third data, which is used for identifying the recording medium, at a predetermined position on the recording medium. The reflective layer is irradiated with laser light to change the protrusion/depression pattern of the second data, thereby recording the third data.

According to the present invention, there is provided a recording method for a recording medium. The recording medium has a substrate on which first data and second data are recorded as a protrusion/depression pattern in advance and a reflective layer that is provided on a surface having the protrusion/depression pattern. The recording method includes recording the first data, the second data, and a data portion of third data, the third data being used for identifying the recording medium, onto the recording medium in advance; and changing the protrusion/depression pattern of the second data by irradiating the reflective layer with laser light, to additionally record another data portion of the third data.

According to the present invention, there is provided a recording medium. The recording medium includes a substrate on which first data and second data are recorded as a protrusion/depression pattern in advance, and a reflective layer provided on a surface having the protrusion/depression pattern. The reflective layer is irradiated with laser light to change the protrusion/depression pattern, thereby recording third data, which is used for identifying the recording medium, at a predetermined position on the recording medium.

BRIEF DESCRIPTION OF THE DRAWINGS

FIGS. 10A and 10B are each a schematic block diagram illustrating a recording method of the UDI, according to the present invention;

DESCRIPTION OF THE PREFERRED EMBODIMENT

One embodiment of the present invention will be described below. The configuration of an optical disc such as a CD will now be described by way of example for ease of understanding of the present invention.

Figure 1:
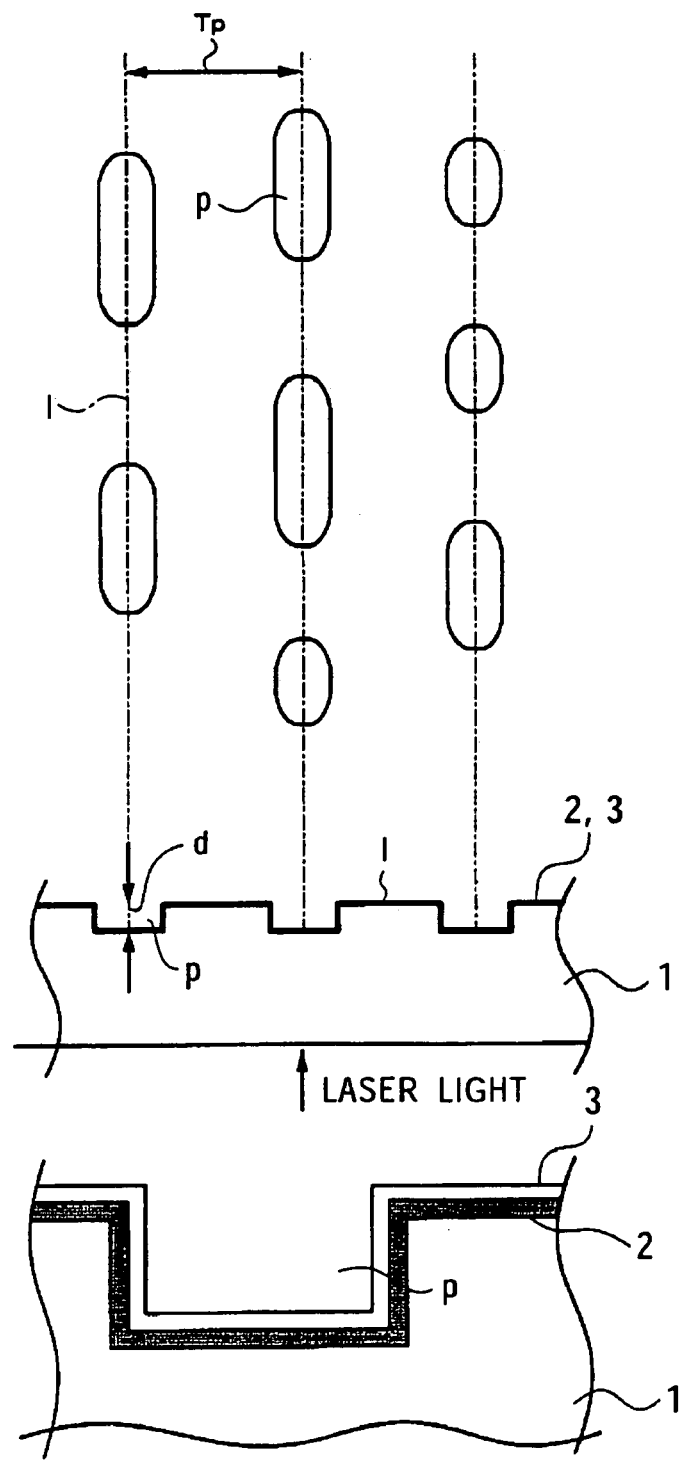
FIG. 1 is a schematic block diagram illustrating the recording pattern and the configuration of a CD.

FIG. 1 is an enlarged view illustrating a portion of a known CD. Depressions called pits p and lands l where pits p are not formed are alternately arranged on a track having a predetermined track pitch (e.g., 1.6 μm). The lengths of pits p and lands l are designed to be in the range of 3T to 11T, where "T" is the minimum inverse interval. The CD is irradiated with laser light from below.

The CD is configured such that a transparent disc substrate 1 having a thickness of 1.2 mm, a reflective layer 2, and a protective layer 3 are deposited sequentially from the lower surface, which is irradiated with laser light. When the wavelength of the laser light is λ, the depth of the pits p is selected to be λ/4 so that the difference between the light intensity of laser light reflected from the pits p and the light intensity of laser light reflected from the lands l is maximized. A high refractive index is used for the reflective layer 2. After the reflective layer 2 is deposited, information is recorded onto the reflective layer 2 using laser light, as described later.

The processing flow of manufacturing such a CD will now be described with reference to FIG. 2. In Step 1, a master disc is created in the following manner. A glass base-plate, in which photo-sensitive material, i.e., a photoresist is applied to a disc-shaped glass plate, is rotated by a spindle motor, and the photoresist film is irradiated with laser light that is turned on and off in accordance with a recording signal. The photoresist film is then developed, in the case of a positive resist, to cause exposed portions to melt, thereby forming a protrusion/depression pattern on the photoresist film.

In step 2, a metal master is created by an electroforming process for performing electroless plating on a photoresist base-plate. In step 3, a plurality of mothers is created from the metal master. In step 4, a plurality of stampers is then created from the mothers. In step 5, disc substrates are created by using the stampers. Compression molding, injection molding, photo curing, and the like are known as methods for creating disc substrates. In step 6, a reflective layer and a protective layer are applied on each disc substrate. In addition, in a conventional disc-manufacturing method, a label is printed on the protective film to fabricate a CD.

Figure 2:
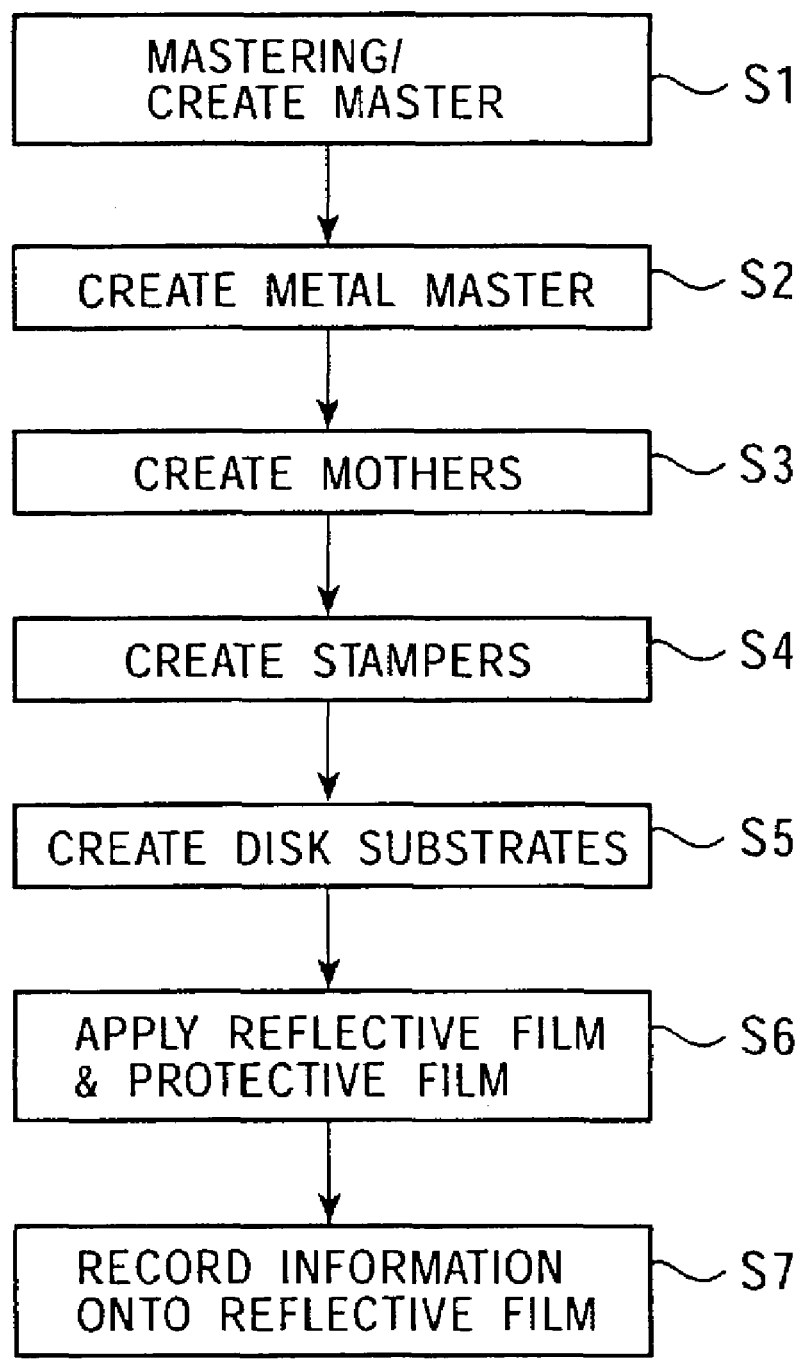
FIG. 2 is a schematic block diagram illustrating the manufacturing process of the disc according to the present invention.

Meanwhile, in the example of FIG. 2, the manufacturing method further includes a process (step S7) in which information is additionally recorded on the reflective layer by radiating laser light thereonto. Thermal processing (thermal recording) due to the irradiation of laser light causes atoms in the lands l on the reflective film to move so that the film structure and the crystallinity change, thereby reducing the refractive index of the irradiated spot. As a result, even with respect to the lands l, after they are irradiated with laser light, the amount of reflected laser light is reduced, so that a reading unit recognizes them as being the same as pits p. This can be used to record information. In this case, material whose refractive index changes due to laser irradiation is used for the reflective layer. Material therefor, however, is not limited to such material, and thus material whose refractive index increases may also be used.

Specifically, the reflective film is made of an aluminium-alloy film of Al100-xXx. As the X, at least one of the elements Ge, Ti, Ni, Si, Tb, Fe, and Ag is used. The composition ratio x in the Al alloy film is selected to satisfy the relationship 5<x<50 (atomic %)

The reflective film can also be formed of an Ag100-xXx alloy film. In such a case, as the X, at least one of the elements Ge, Ti, Ni, Si, Tb, Fe, and Al is used. The composition ratio x in the Ag alloy film is selected to satisfy the relationship 5<x<50 (atomic %). The reflective film can be formed by, for example, magnetron sputtering.

By way of example, the reflective film is formed of an AlGe alloy to have a thickness of 50 nm, and laser light is radiated from the transparent substrate side or the protective layer side via an objective lens. In this case, for a Ge-composition ratio of 20 atomic %, with a recording power of 6 to 7 mW, the refractive index decreased by about 6%. For a Ge-composition ratio of 27.6 atomic %, with a recording power of 5 to 8 mW, the refractive index decreased by about 7 to 8%. Such a change in refractive index allows for an additional recording onto the reflective film.

Figure 3:
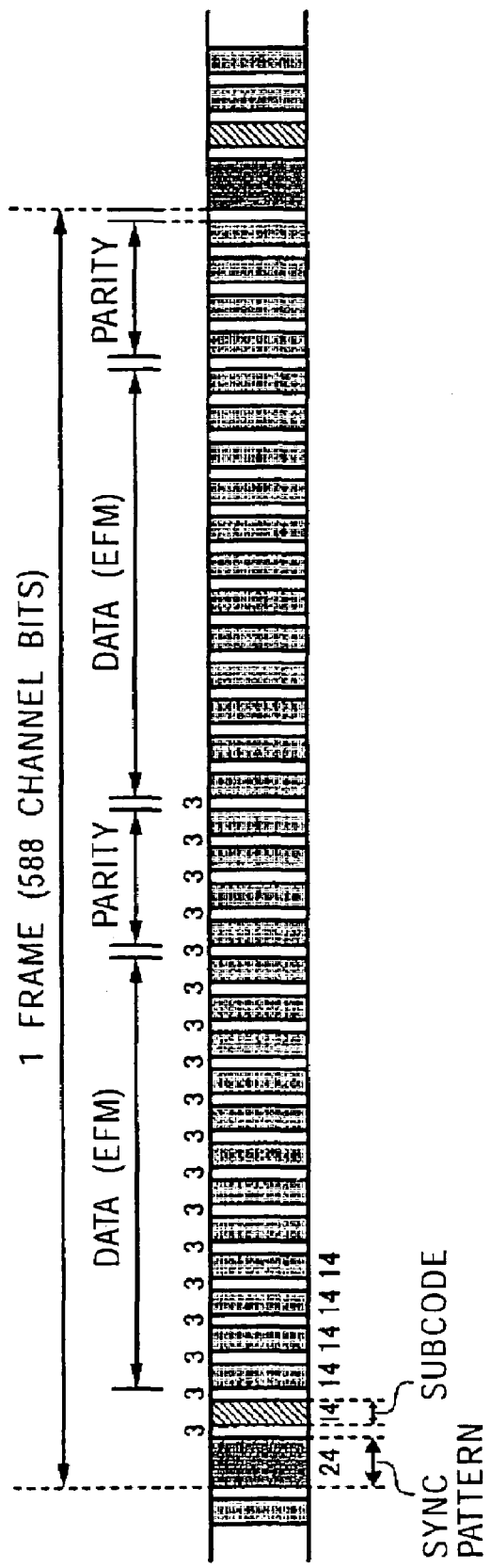
FIG. 3 is a schematic block diagram illustrating the frame format of the CD.

FIG. 3 illustrates the data structure of one frame of a signal in a CD format. A total of 12 samples of 2-channel digital audio data (24 symbols), a parity Q and a parity P, each parity having 4 symbols, are provided in a CD. A total of 33 symbols (264 data bits), i.e., a total of 32 symbols thereof and one symbol of a subcode, is treated as one group. In other words, 33 symbols, i.e., 1-symbol subcode, 24-symbol data, 4-symbol Q parity, and 4-symbol P-parity are included in one frame after EFM (Eight to Fourteen Modulation).

Each symbol (8 data bits) is converted into 14 channel bits by an EFM system. The minimum time (an interval when the number of 0s between recording signals 1s is minimized) Tmin in EFM is 3T, and the bit length that corresponds to 3T is 0.87 μm. The bit length that corresponds to T is the shortest bit length. Three margin bits are provided between neighboring 14-channel bits. Further, a frame sync pattern is added to the head of the frame. When one cycle of the channel bits is T, the frame sync pattern has a repeating pattern of 11T, 11T, and 2T. Since such a pattern is not generated in accordance with EFM rules, a unique pattern is used to allow the detection of the frame sync. One frame consists of 588 channel bits in total. The frame frequency is set to be 7.35 kHz.

An aggregation of 98 pieces of such frames is referred to as a "subcode frame"; (or, subcode block). A subcode frame in which 98 frames are rearranged so as to continue in a vertical direction includes a frame synchronization field for identifying the head of the subcode frame, a subcode field, data, and parity field. The subcode frame corresponds to 1/75 th of a second of a typical CD playback time.

The subcode field is made of 98 frames. Each of the first two frames in the subcode field serves as a synchronization pattern for the subcode frame and is a pattern that is outside the scope of EFM rules. Individual bits in the subcode field correspondingly provide P, Q, R, S, T, U, V, and, W channels.

The R to W channels are used for a special application, such as displaying still-images or characters for a so-called "karaoke" machine. The P channel and Q channel are used for controlling the track position of a pickup when digital data recorded on a disc is played back.

The P channel is used to record a "0" signal in a so-called "lead-in area" located at the inner periphery of the disc, and to record a signal having either one of "0" and "1" which are repeated at a predetermined cycle in a so-called "lead-out area" located at the outer periphery of the disc. In a program area located between the lead-in area and the lead-out area of the disc, the P channel is also used to record a signal "1" between two pieces of music and a signal "0" in other areas. Such a P channel is provided to read the beginning of each piece of music when digital audio data recorded in a CD is played back.

Figure 4:
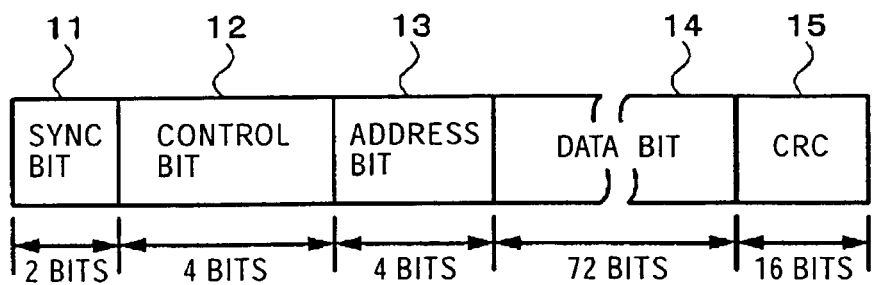
FIG. 4 is a schematic block diagram illustrating the subcode frame of a Q-channel subcode.

The Q channel is provided to allow fine controlling of digital audio data recorded in a CD when it is played back. Referring to FIG. 4, one subcode frame of the Q channel is configured to include a synchronization-bit field 11, a control-bit field 12, an address-bit field 13, a data bit field 14, and a CRC-bit field 15.

The synchronization-bit field 11 consists of 2-bit data, in which a portion of the above-mentioned synchronization pattern is recorded. The control-bit field 12 consists of 4-bit data, in which data for identifying the number of audio channels, emphasis, digital data,. or the like is recorded. For example, data "0000" of 4 bits represents 2-channel audio without pre-emphasis, "1000" represents 4-channel audio without pre-emphasis, "0001" represents 2-channel audio with pre-emphasis, and "1001" represents 4-channel audio with pre-emphasis. Further, data "0101" of 4 bits represents a non-audio data track. The address-bit field 13 consists of 4-bit data, in which a control signal for indicating the format (mode) or type of data within the data-bit field 14, which will be described below, is recorded. The CRC-bit field 15 consists of 16-bit data, in which data for detecting an error in a CRC (cyclic redundancy check) code is recorded.

Figure 5:
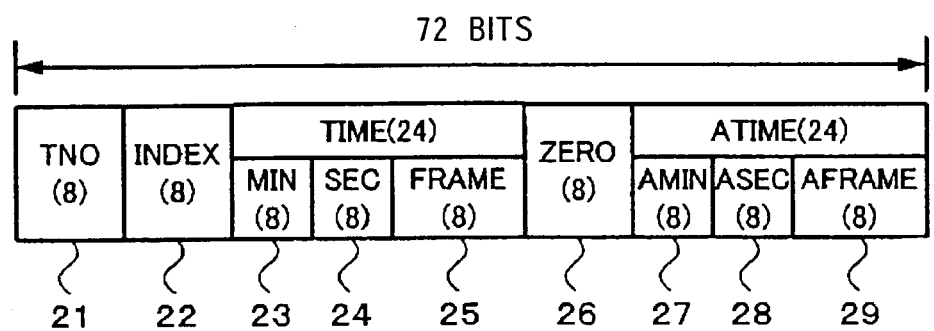
FIG. 5 is a schematic block diagram showing a mode-1 format for recording time information as a Q-channel subcode.

The data-bit field 14 consists of 72-bit data. When the 4-bit data of the address-bit field 13 is "0001"(i.e., mode 1), as shown in FIG. 5, the data-bit field 14 has a format in which time codes (position information) are recorded. That is, the data-bit field 14 includes a track-number field (TNO) 21, an index field (INDEX) 22, an elapsed-time field (which consists of a minute-component field (MIN) 23, a second-component field (SEC) 24, and a frame-number field (FRAME) 25), a zero field (ZERO) 26, and an absolute-time field (which consists of a minute-component field (AMIN) 27, a second-component field (ASEC) 28, and a frame-number field (AFRAME) 29). These fields each consist of 8-bit data.

The track-number (TNO) field 21 is represented in 2-digit binary-coded decimal (BCD). In the track-number field (TNO) 21, "00" indicates a lead-in track number in which data reading is started, and "01" to "99" each indicate a track number that corresponds to a music number, musical-movement number, or the like. In the track-number field (TNO) 21, "AA" in a hexadecimal representation indicates a lead-out track number for a track in which data reading ends.

The index field (INDEX) 22 is represented in 2-digit BCD, and "00" indicates "temporary stop", that is, a so-called "pause", and "01 to "99" each indicate segmented information in the track of music, musical movement, or the like.

The minute-component field (MIN) 23, the second-component field (SEC) 24, and the frame-number field (FRAME) 25 are each represented in 2-digit BCD, and indicates an elapsed time (TIME) in each piece of music or musical movement by using 6 digits in total. In the zero field (ZER) 26, all the 8 bits thereof are given "0".

The minute-component (AMIN) field 27, the second component (ASEC) field 28, and the frame-number field (AFRAME) 29 are each expressed in 2 digit BCD, and indicate an absolute time (ATIME) elapsed from the first piece of music by using a total of 6 digits.

Figure 6:
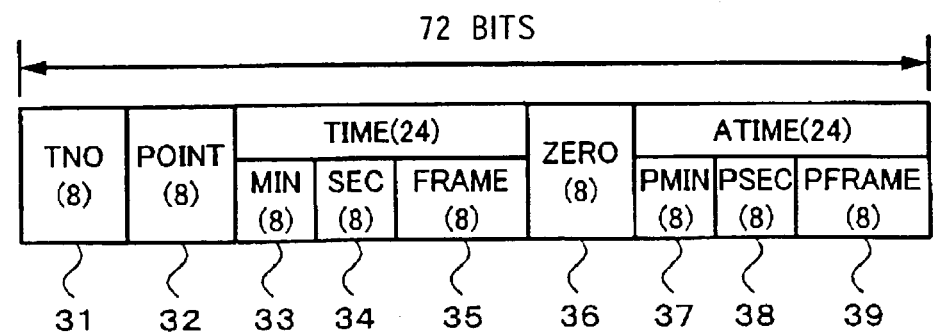
FIG. 6 is a schematic block diagram illustrating a mode-1 format in a TOC area.

As shown in FIG. 6, the data-bit field 24 in a TOC (table of contents) in the lead-in area of the disc is configured to include a track-number field (TNO) 31, a point field (POINT) 32, an elapsed-time field (which consists of a minute-component field ((MIN) 33, a second-component field (SEC) 34, and a frame-number field (FRAME) 35), a zero field (ZERO) 36, an absolute-time field (which consists of a minute-component field (PMIN) 37, a second-component field (PSEC) 38, and a frame-number field (PFRAME) 39). These fields each consist of 8-bit data.

The track-number field (TNO) 31, the minute-component field (MIN) 33, the second-component field (SEC) 34, and the frame-number field (FRAME) 35, which are used for an elapsed time, are each set to "00" in a hexadecimal representation. In the zero field (ZERO) 36, all the 8 bits thereof are given "00" similarly to the zero field (ZERO) 26 described above.

When the point field (POINT) 32 has "A0" in a hexadecimal representation, the minute-component field (PMIN) 37 indicates a first music number or a musical-movement number. When the point field (POINT) 32 has "A1" in a hexadecimal representation, the minute-component field (PMIN) 37 indicates a last music number or a musical-movement number. When the point field (POINT) 32 has "A2" in a hexadecimal representation, the minute-component field (PMIN) 37, the minute-component field (PSEC) 38, and the frame-number field (PFRAME) 39 indicate an absolute time (PTIME) at which the lead-out area starts. Further, when the point field (POINT) 32 is represented in 2-digit BCD, the minute-component field (PMIN) 37, the second-component field (PSEC) 38, and the frame-number field (PFRAME) 39 indicate an absolute time (PTIME), which represents, in numeric values, the address of the beginning of each piece of music or musical movement.

Thus, while Q channels in a program area and a lead-in area of a disc have somewhat different formats, time information represented by 24 bits is recorded in both Q channels. In the CD standard, it is defined that a Q-channel subcode in mode 1 shown in FIG. 5 must be included in 9 subcode frames or more out of any 10 consecutive subcode frames on a disc. As described above, the subcode frames refers to 98 consecutive frames that constitute one subcode field whose first two frames are used for the synchronization pattern.

Meanwhile, other than mode-1 subcode, it is defined that the mode-2 to -5 subcodes must be in at least one of the 100 consecutive subcode frames. Mode 2 and 3 are used to record a UPC/EAN (Universal Product Code/European Article Number) code and an ISRC (International Standard Recording Code). Mode 4 is used in a CD-V format. Mode 5 is used for a lead-in in a multi-session CD-EXTRA format. Thus, in practice, it is sufficient to consider Q-channel subcodes in modes 1, 2, and 3, and the descriptions of modes 4 and 5 are omitted hereinafter.

As described above, in the embodiment of the present invention, laser light is radiated onto the reflective layer to cause a change in the refractive index thereof so that information is recorded onto the reflective layer. A case in which disc identification information, i.e., unique disc information (hereinafter referred to as "UDI"), as one example of information, is recorded will now be described. The UDI includes first data unique to each stamper, and second data unique to each disc, which are data used for identifying each disc. Examples of the first data include a disc manufacturer's name, disc vender's name, manufacturing plant's name, and year of manufacture. Examples of the second data include a serial number and time information. In one embodiment, the UDI is recorded in the data format of the subcode Q-channel. Thus, the UDI can be refereed to as a new mode for the subcode Q-channel. In this case, mode 7 is designated as a Q-channel mode for recording the UDI.

Thus, when the UDI includes the first data and the second data, a large amount of the UDI data cannot be recorded by using the method for recording data onto the reflective layer, since the time for recording is limited. Thus, according to the present invention, recording is performed by using a method for recording the first data, which is unique to each stamper, in a protrusion/depression pattern and for recording the second data, which is unique to each disc, onto the reflective film. Additionally, according to the present invention, after manufacture, optional data (third data) can be recorded by using a method for recording data onto the reflective layer on the disc. In practice, the optional data is recorded at record stores, rental stores, and the like which have dedicated recording apparatuses. The optional data includes a store-name code, the number of times rented, user ID information, and the like.

In the description below, a method for recording data as a protrusion/depression pattern will be referred to as "pre-pressing", and a method for recording data onto the reflective layer will be referred to as "pre-recording". A main portion of UDI data will be referred to as a "payload", a payload that is pre-pressed and a payload that is pre-recorded will be generally referred to as a "P-payload", and a main portion of third data that will be recorded later will be referred to as an "R-payload".

Figures 7A, 7B, 7C:
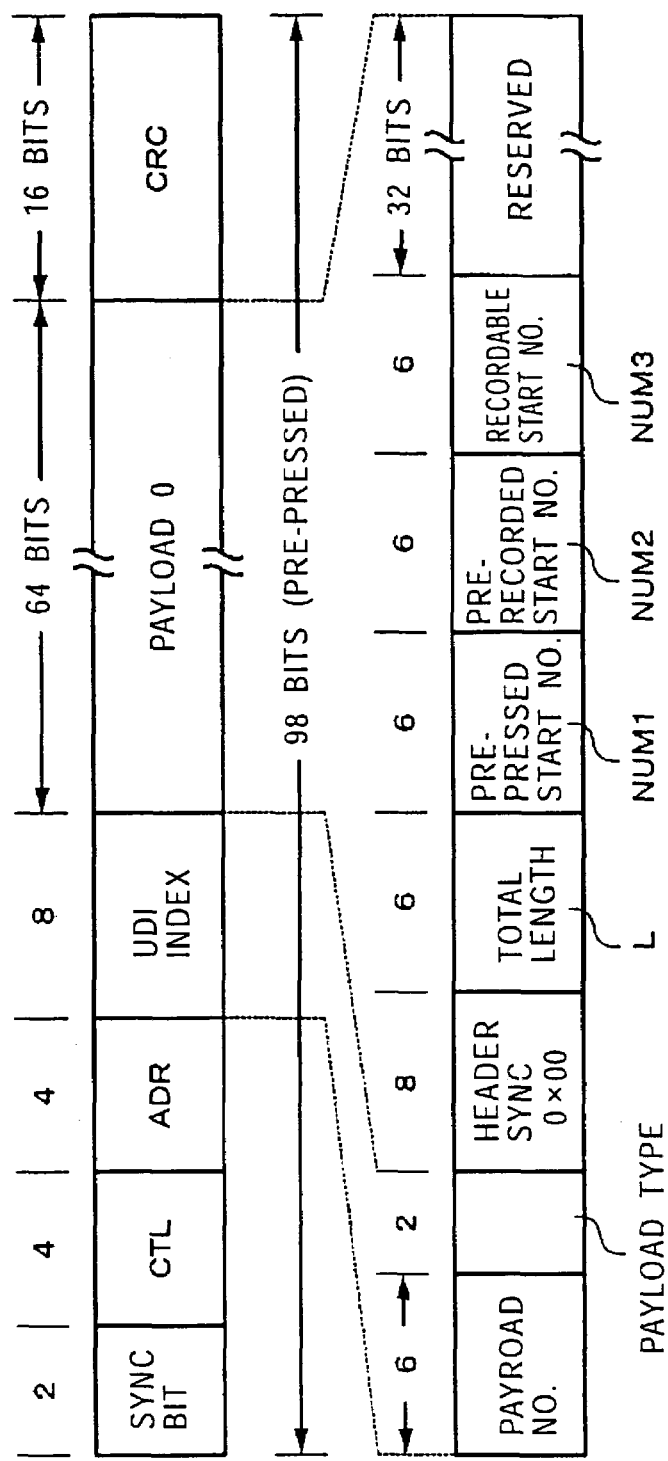
FIGS. 7A to 7C are each a schematic block diagram illustrating a frame format when UDI is recorded as a Q-channel subcode, according to the present invention.

FIG. 7A shows the data format of UDI that is constituted by a subcode frame consisting of 98 frames. Since UDI is recorded in a subcode Q-channel format, one subcode frame (98 bits) includes a 2-bit synchronization-bit field, a 4-bit control-bit field (CTL), a 4-bit address-bit field (ADR), a 72-bit data-bit field, and a 16-bit CRC. The 4 bits of the address-bit field (ADR) has a value that indicates mode 7.

The first 8 bits in the 72-bit data area represents a UDI index, and the remaining 64 bits represents main data (payload) of-the UDI. As shown in FIG. 7C, the UDI index includes a payload number (6 bits), which indicates the ordinal position of the payload, and a payload type (2 bits), which indicates the type of payload. The payload number is a value incremented from 1, and, for example, the minimum number of payloads is 1 and the maximum number is 63. The data format shown in FIG. 7A is common to both P-payload and R-payload. The 2 bits of a payload type is defined as follows:

| | |
|---|---|
| 00: | pre-pressed payload |
| 01: | pre-recorded payload |
| 10: | recordable (recorded) |
| 11: | recordable (unrecorded) |

Thus, the 2 bits of a payload type serves as an identifier for a payload subsequent thereto.

The UDI is recorded in a UDI area that is provided in, for example, a program area on a disc. A pre-press payload area, a pre-record payload area, and a recordable payload area are sequentially provided in the UDI area. A payload (hereinafter referred to as "payload 0") that serves as a UDI header is recorded at the head of the UDI area.

FIG. 7B shows the data format of payload 0. A subcode frame that includes payload 0 has been recorded by pre-pressing. As shown in FIG. 7C, payload 0 includes a header sync (8 bits), a total length L (6 bits), a pre-pressed start number NUM 1 (6 bits), a pre-recorded start number NUM2 (6 bits), and a recordable start number NUM3 (6 bits). The remaining 32 bits are unspecified and are reserved for future use. The payload number of payload 0 is set to "0".

Figures 8A, 8B, 8C:
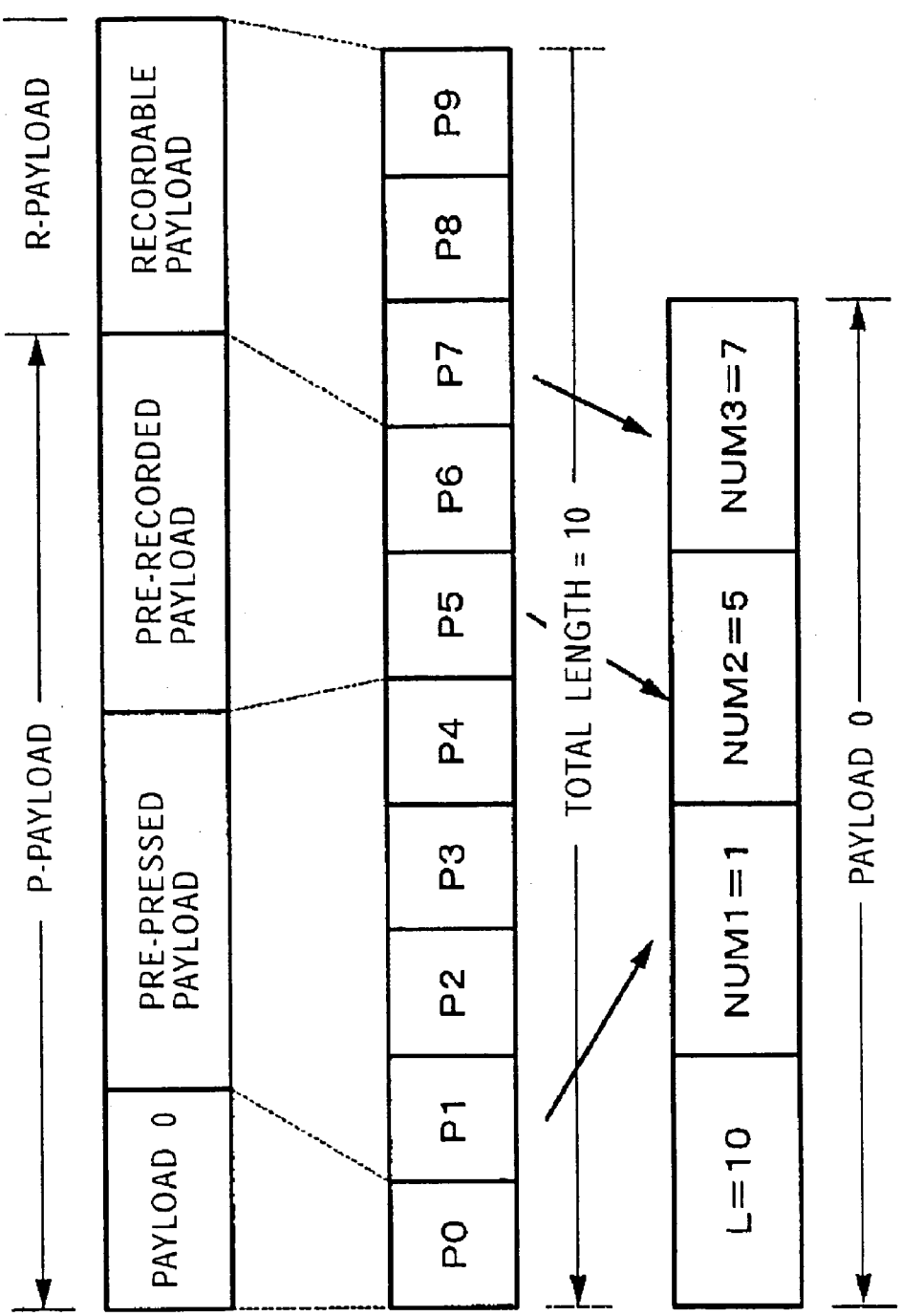
FIGS. 8A to 8C are each a schematic block diagram illustrating a specific example of a UDI area and payload 0, according to the present invention.

Information included in payload 0 will be specifically described with reference to FIGS. 8A to 8C. FIG. 8A shows UDI that is recorded in a UDI area. Payload 0 is placed at the head of the UDI area, and then a pre-pressed payload, a pre-recorded payload, and a recordable payload are placed in sequence.

FIG. 8B shows one example of data in the UDI area. In FIG. 8B, "P" indicates one payload and a number appended thereto indicates a payload number. In the example of FIG. 8B, the pre-pressed payload consists of 4 payloads, namely, P1 to P4; the pre-recorded payload consists of 2 payloads, namely, P5 and P6; and the recordable payload consists of 3 payloads, namely, P7 to P9. The configuration shown in FIG. 8B constitutes UDI data. It is also possible not to provide the recordable payload. The UDI data shown in FIG.

8B is recorded on a disc multiple times, for example, five times, as will be described later.

With respect to the example of FIG. 8B, as shown in FIG. 8C, the total length is 10 (L=10), the pre-pressed start number is 1 (NUM1=1), the pre-recorded start number is 5 (NUM2=5), and the recordable payload number is 7 (NUM3=7). From these pieces of information in payload 0, the configuration of the UDI area can be known. Thus, the lengths (the number of payloads) of the pre-pressed payload area, pre-recorded payload area, and recordable payload area can be known. The start number and the end number of each payload may be recorded as individual payloads 0. However, the method according to the present invention allows for writing of the configuration of a UDI area with a less amount of data.

Figure 9:
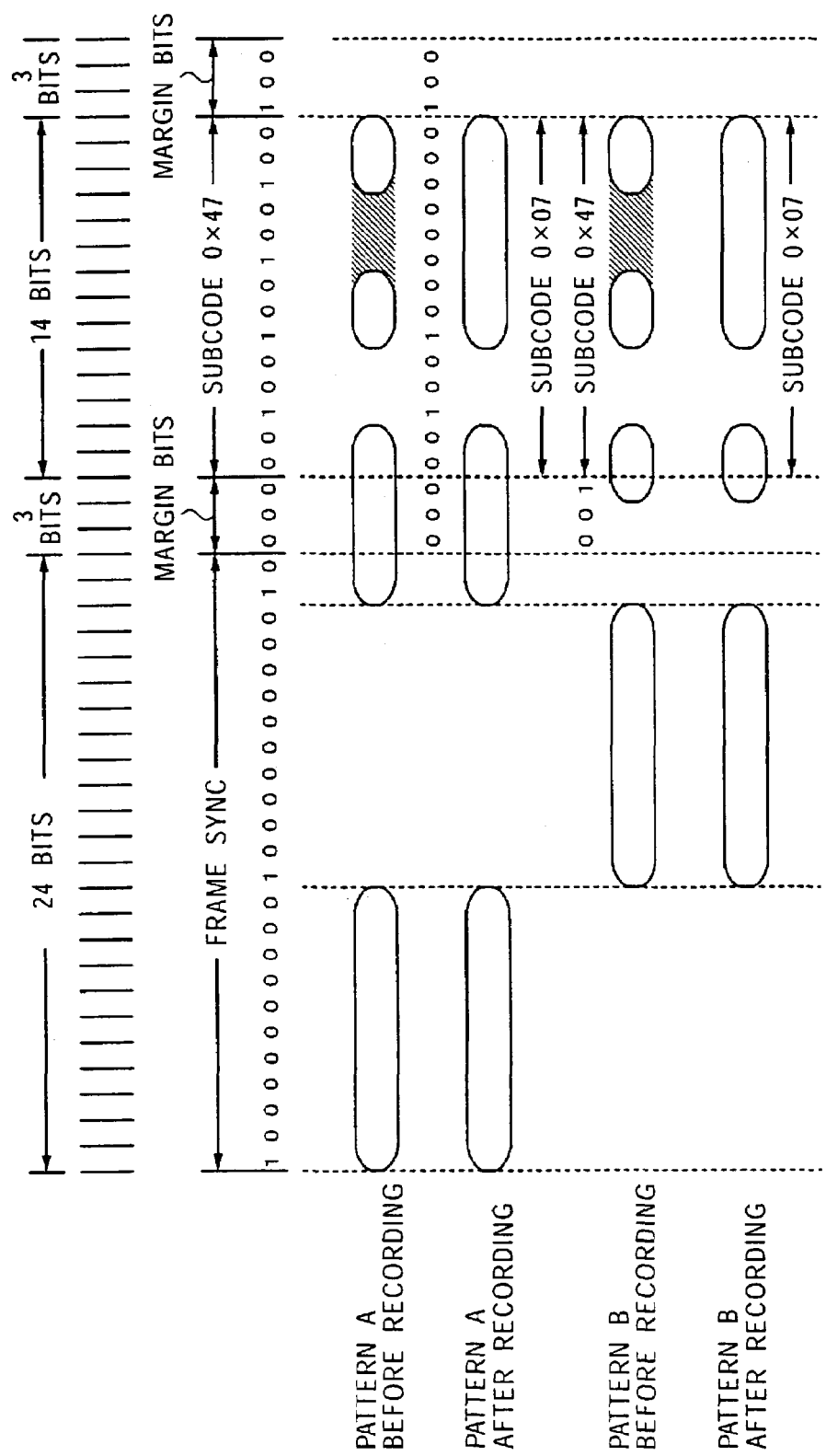
FIG. 9 is a schematic block diagram illustrating a recording method of UDI, according to the present invention.

FIG. 9 is a view specifically illustrating a method for additionally recording UDI. The frame sync has a length of 24 bits (channel bits), and the inverse intervals are 11T and 11T, which are followed by 2T. Pattern A and pattern B are available depending on how two 11Ts are associated with pits and lands. First, pattern A will be described.

Three margin-bits (000) are provided between a frame sync and a subcode symbol. When UDI is recorded, the subcode symbol on an optical disc that is formed by stamping is "0×47". "0x" indicates a hexadecimal representation. FIG. 9 shows a 14-bit pattern "00100100100100" resulted from EFM (Eight-to-Fourteen-Modulation) of the 8 bits of the subcode.

A laser beam for additional recording is radiated onto a hatched area between two pits shown in FIG. 9. As a result, the refractive index of the hatched area is reduced, and after recording, the area is played back as one pit into which the two pits are coupled. This results in a 14-bit pattern "00100100000000". When this value is subjected to EFM demodulation, 8 bits "0×07" is provided.

For pattern B in which the first 11T is a land and the last 11T is a pit, the margin bits indicate "001". Also in this case, a laser beam is radiated onto the hatched area in FIG. 9, in the same manner as pattern A, to allow the 8 bits of the subcode to change from "0×47" to "0×07".

As shown in FIG. 10A, of the 98 frames, in 96 frames other than the first 2 frames for a synchronization signal, the 8 bits of the subcode correspond to individual bits of channels P, Q, R, S, T, U, V, and W. Thus, as is apparent from FIG. 10A, to change from "0×47" to "0×07", only the bit of channel Q is changed from "1" to "0" without changing bits other than the bit of channel Q. Thus, 88 bits included in one subcode frame of UDI all represent "1" before recording, and only the portion irradiated with a laser beam represents "0".

FIG. 10B illustrates an alternative example of the method for additional recording. Specifically, this is an example of changing the 8 bits of a subcode from "0×40" to "0×00" when the UDI has "0" bits. Also in this alternative example, the bit of only channel Q can be changed from "1" to "0" without changing bits other than the bit of channel Q.

Further, in the examples of FIGS. 10A and 10B, channel P has a value of "0". Channel P becomes "1" between two pieces of data, for example, between two pieces of music (i.e., an intermission), and becomes "0" within data, such as music data. Since a typical intermission is short, for example, 2 to 3 seconds, a playback apparatus may not read, upon determining the intermission, a subcode written in the intermission. Thus, an intermission is inappropriate as a place for recording UDI. As described above, setting channel P to "0" (P=0) allows recording of the UDI into a music data portion.

A UDI area, in which UDI is recorded, is provided at a fixed position on a disc. When a method, in the same manner as mastering, for additionally recording information onto the reflective layer by rotating a disc is employed to record UDI in substantially the entire program area on a disc, time required for recording is extended. Thus, the UDI area is provided at, for example, the front portion of the program area such that the UDI is recorded thereinto.

In the CD format, a ratio with respect to subcode Q-channels is specified. Thus, as described above, mode-1 subcodes must be included in 9 subcode frames or more out of any 10 consecutive subcode frames on a disc. With respect to the subcodes of mode 2 and 3, other than mode 1, it is specified that they need to be in at least one subcode in consecutive 100 subcode frames.

Figure 11:
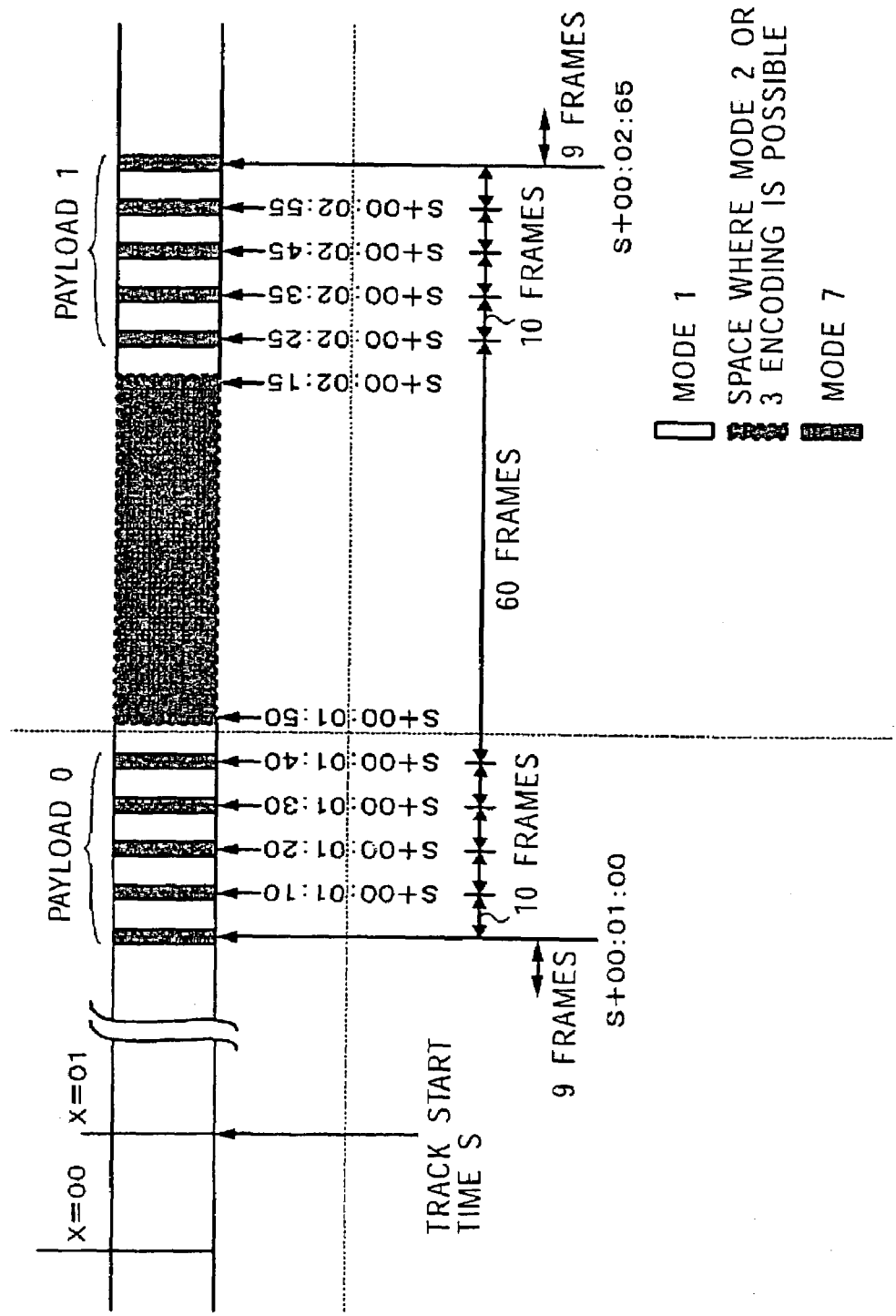
FIG. 11 is a schematic block diagram illustrating a first example of the layout of a UDI area.

A description will now be given for a method for recording UDI in a fixed position while satisfying the ratio rule for subcodes. FIG. 11 shows an example of the recording layout of UDI. In the present invention, the UDI is a mode-7 subcode. Payload 0 is recorded at the head of a UDI area. When payload 0 and the other payloads are recorded, multiple recording is performed for providing a measure against errors. In the example of FIG. 11, each payload is recorded five times. After payload 0, other payloads such as payload 1 are recorded. When recording is performed five times, payloads having the same payload number are recorded five times in succession. This facilitates multiple recording, as shown in FIG. 11, even when there are different pieces of data recorded at different time points.

In FIG. 11, each payload is recorded five times at an interval of 10 subcode frames in the UDI area. When the track start time is S, payloads are arranged at a position "S+00(min):01(sec):00(frame); S+00:01:10, . . . " at an interval of 10 frames (i.e. subcode frames). A mode-2 or -3 subcode can be recorded in an area from a position "S+00:01:50", which is subsequent to the end of a payload 0 recording area "S+00:01:40", to a position "S+00:02:15". A first payload 1 is recorded at a position "S+00:02:25".

Mode-1 subcodes are recorded in 9 subcode frames before the first payload recording area and 9 subcode frames after the last payload. Further, in the UDI area, areas other than payloads (mode 7) and the mode-2 or -3 subcode are used for recording mode 1 subcodes.

Numeric values in the subcode frames in the recording layout shown in FIG. 11 are merely examples, and various numeric values can be used. For example, the interval at which payloads are arranged may be set to 11 subcode frames, 12 subcode frames, or the like. Even in such a case, the ratio of included mode-1 subcodes must satisfy the standard. The ratio rule for mode 1 cannot be violated since mode 1 is high in order of importance compared to either mode 2 or 3; however, the ratio rule for mode 2 or 3 may not be satisfied in some cases. For example, an area into which mode 2 or 3 can be recorded may be omitted.

Figure 12:
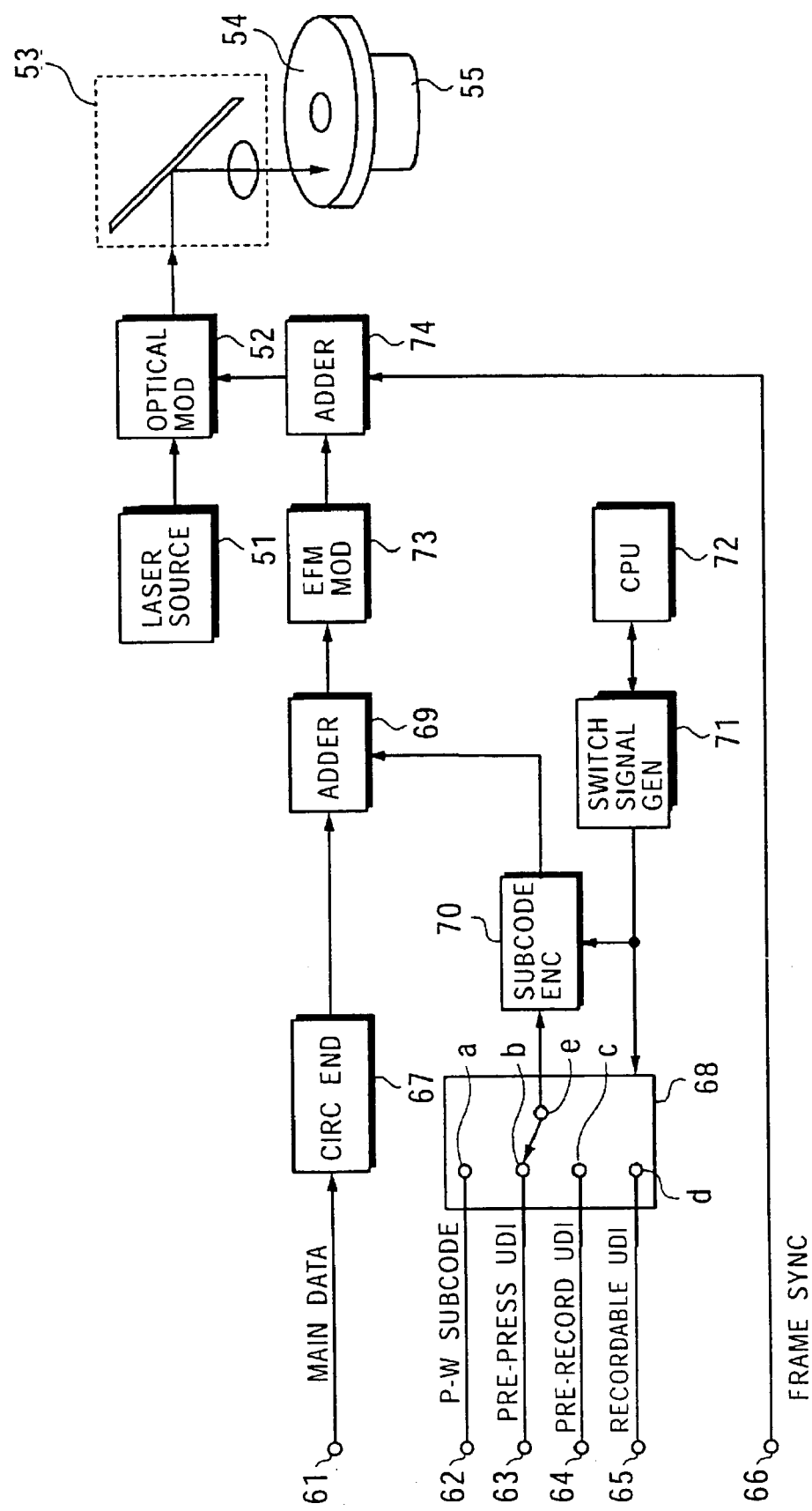
FIG. 12 is a block diagram showing one example of the configuration of a mastering apparatus according to the present invention.

FIG. 12 shows an example of the configuration of a mastering apparatus for creating a data-recording medium according to the present invention. The mastering apparatus includes, a laser light source 51, an optical modulator 52, and an optical pickup 53. The laser light source 51 is, for example, a semiconductor laser or a gas laser, such as an Ar ion laser, He-Cd laser, or Kr ion laser. The optical modulator 52 is an acoustic-optical-effect type or electro-optical type modulator and modulates laser light that is emitted from the laser light source 51. The optical pickup 53 converges laser light that has passed through the optical modulator 52, and has an objective lens or the like for irradiating the photoresist surface of a disc-shaped glass base-plate 54 to which photo-sensitive material, i.e., a photoresist, is applied.

The optical modulator 52 modulates laser light from the laser light source 51 in accordance with a recording signal. The mastering apparatus creates a master on which data is recorded, by radiating the modulated laser light onto the glass base-plate 54. The mastering apparatus is further provided with a servo circuit (not shown) for controlling the focus so that a fixed distance between the optical pickup 53 and the glass base-plate 54 is maintained and for controlling the operation of driving and rotating a spindle motor 55. The spindle motor 55 rotates the glass base-plate 54.

A recording signal from an adder 74 is supplied to the optical modulator 52. Main digital data to be recorded is supplied from an input terminal 61. The main digital data has, for example, a CD-ROM data format. Channel P-W subcodes (hereinafter referred to as "normal subcodes") in accordance with a current CD standard are supplied from an input terminal 62. The normal subcodes include not only mode-1 subcodes but also mode-2 and -3 subcodes. Pre-press UDI data is supplied from an input terminal 63. The pre-press UDI data contains a pre-press. payload that is unique to each stamper.

Pre-record UDI data is supplied from an input terminal 64. Recordable UDI data is supplied from an input terminal 65. Payloads included in the pre-record UDI data and the recordable UDI data each represent data "0×47" or "0×07", as described above. Further, a frame sync is supplied from an input terminal 66.

The main digital data is supplied to a CIRC (Cross Interleaved Read-Solomon Code) encoder 67, and is subjected to scrambling and error correction encoding for adding, for example, parity data for error correction. That is, 16 bits of one sample or one word is divided into a higher-order 8-bit portion and a lower-order 8-bit portion, each portion being represented by a symbol. For each symbol, the scrambling and error correction encoding are performed.

Pieces of data from the input terminals 62, 63, 64, and 65 are supplied to input terminals a, b, c, and d of a switch circuit 68, respectively. Data selected by the switch circuit 68 is converted by a subcode encoder 70 into a subcode frame format. Switch signals are supplied from a switch-signal generator 71 to the switch circuit 68 and the subcode encoder 70.

The switch-signal generator 71 generates the switch signals in accordance with a control signal from a controller (shown as a CPU in FIG. 12) for controlling the entire mastering apparatus. As described above, the UDI area is provided at a fixed position on a disc, and also a position at which the UDI data (a mode-7 subcode) is recorded is fixed within the UDI area. In accordance with the switch signal, the subcode encoder 70 converts data extracted at an output terminal e of the switch circuit 68 into a subcode format.

In the data format shown in FIG. 7A, the synchronization bits, control bits, address bits, and UDI index may be recorded by using the method for recording onto the reflective layer, or may be recorded as a protrusion/depression pattern by pre-pressing. The CRC bit cannot be recorded by pre-pressing since it is detected in accordance with a payload that is recorded. However, designating values for 16 bits in a payload makes it possible to prevent an CRC error from occurring even when the original CRC bits are all "1".

The main data from the CIRC encoder 67 and an output from the subcode encoder 70 are added by an adder 69. An output from the adder 69 is supplied to an EFM modulator 73, in which an 8-bit symbol is converted into 14 channel-bit data in accordance with a conversion table. An output from the EFM modulator 73 is supplied to the adder 74. The frame sync from the input terminal 66 is supplied to the adder 74, by which a recording signal having the above-described frame format is generated. The recording signal is supplied to the optical modulator 52, and the photoresist on the glass base-plate 54 is exposed to the laser beam modulated by the optical modulator 52. The glass base-plate 54 onto which recording is performed in this manner is developed and is subjected to an electroforming process to create a metal master. Mother discs are then created from the metal master. Thereafter, stampers are created from the mother discs. Next, optical discs are created from the stampers by using compression molding, injection molding, or the like. The optical discs are similar to typical CDs, but material for the reflective layer is selected so that UDI can be additionally recorded, as described above.

Figure 13:
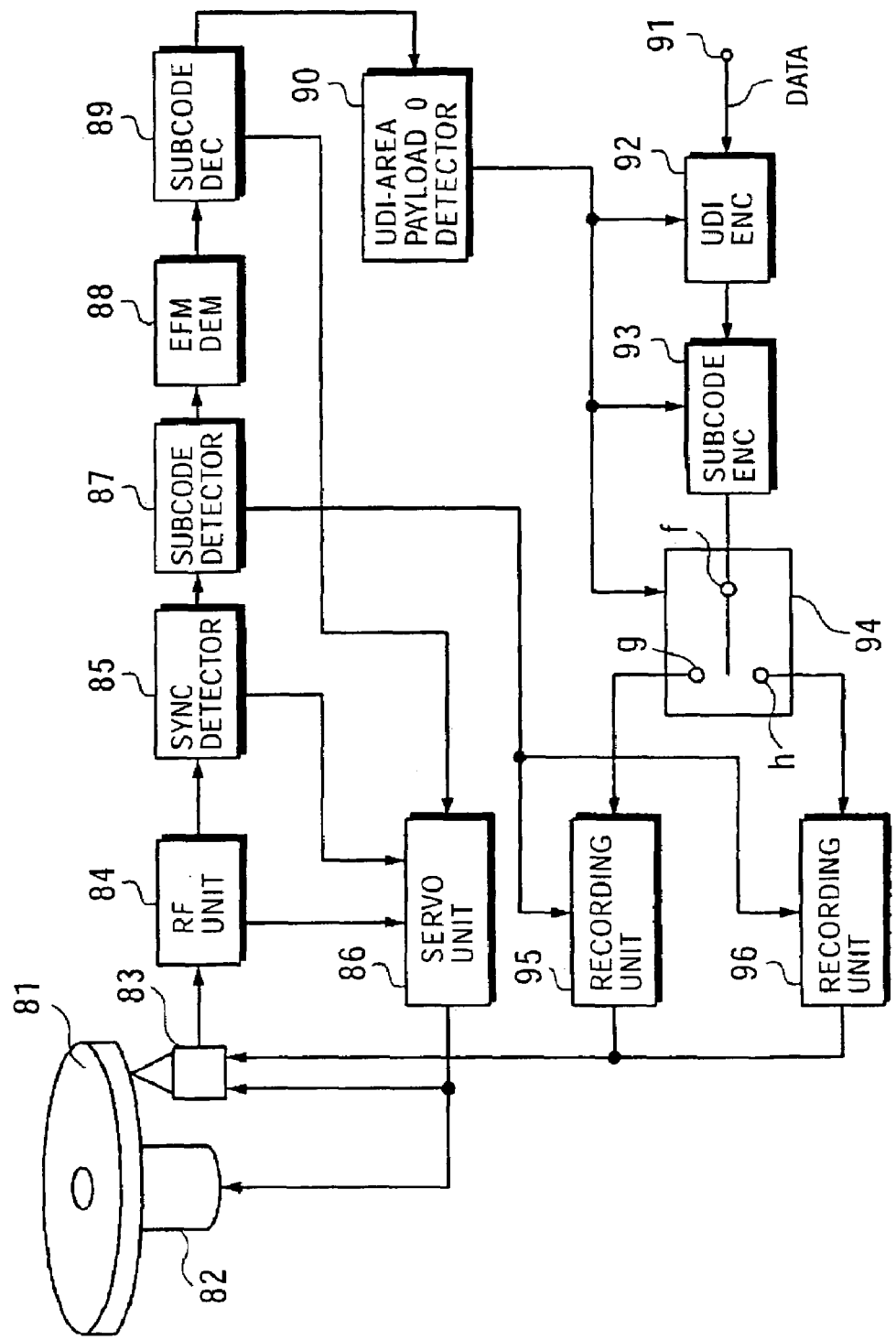
FIG. 13 is a block diagram showing an example of the configuration of a UDI recording apparatus that performs recording based on the layout of the UDI area shown in FIG. 11.

FIG. 13 is an example of the configuration of a record/playback apparatus for additionally recording UDI data onto an optical disc that is created by the above-described mastering and stamping. A pre-record payload and a recordable payload are available as UDI data to be additionally recorded. The configuration shown in FIG. 13 can be used to record either of the payloads. The record/playback apparatus, however, does not necessarily have to be able to record both types of the payloads, and thus may be designed to record only one of them.

In FIG. 13, reference numeral 81 indicates a disc that is created by the mastering and stamping processes and reference numeral 82 indicates a spindle motor for rotating the disc 81. Reference numeral 83 indicates an optical pickup for playing back signals recorded on the disc 81 and for recording UDI. The optical pickup 83 includes a semiconductor laser for radiating laser light onto the disc 81; an optical system, including an objective lens; a photo-detector for receiving light that has reflected from the disc 81; a focusing mechanism, and a tracking mechanism. The output level of laser light, i.e., laser power, is switched between the time of recording and the time of non-recording. During recording, laser light having power required for causing a change in the refractive index of the reflective film is used, and during non-recording, for example, during playback, laser light having power that is required for reading information recorded on the disc 81, that is, laser light that is lower than that for recording, is used. The optical pickup 83 is also moved by a sled mechanism (not shown) in the radial direction of the disc 81.

Output signals from, for example, four photo-detecting elements of the optical pickup 83 are supplied to an RF unit 84. The RF unit 84 generates a playback (RF) signal, a focus error signal, and a tracking error signal, by calculating the output signal from each photo-detecting element. The playback signal is supplied to a frame-sync detector 85. The frame-sync detector 85 detects a frame sync appended to the head of each frame. The detected frame sync, and a focus error signal and a tracking error signal which are generated by the RF unit 84 are supplied to a servo circuit 86. In accordance with an RF-signal playback clock, the servo circuit 86 controls the rotational operation of the spindle motor 82, and controls the focus servo and tracking servo of the optical pickup 83.

Main data output from the frame-sync detector 85 is supplied to an EFM demodulator 88 through a subcode detector 87, and is subjected to EFM demodulation processing. Main digital data from the EFM demodulator 88 is extracted at an output terminal (not shown) as required. Subcode data from the EFM demodulator 88 is supplied to a subcode decoder 89. The subcode decoder 89 gathers 8-bit subcodes from each frame, totaling 98 frames, to constitute subcode frame data.

The output of the subcode decoder 89 is connected to a detector 90 for a UDI area and payload 0. The detector 90 detects data of payload 0 from a payload area and performs error correction based on payload 0 data that is recorded multiple times. From the payload 0 data, the configuration of the UDI area and the recording position of a pre-record payload or a recordable payload can be known. Information from the detector 90 is supplied to a UDI encoder 92 and a subcode encoder 93.

Data from an input terminal 91 is supplied to the UDI encoder 92. The UDI encoder 92 generates a UDI payload and the subcode encoder 93 converts the payload into a subcode format. An output from the subcode encoder 93 is supplied to an input terminal f of a switch circuit 94. The switch circuit 94 is controlled in accordance with an output from the detector 90. When a pre-record payload is to be recorded, the switch circuit 94 selects an output terminal g, and when a recordable payload is recorded, the switch circuit 94 selects an output terminal h.

Data of the pre-record payload from the output terminal g of the switch circuit 94 is supplied to a recording unit 95, and data of the recordable payload from the output terminal h of the switch circuit 94 is supplied to a recording unit 96. Subcodes from the subcode detector 87 are supplied to the recording units 95 and 96. Outputs from the recording units 95 and 96 are supplied to the optical pickup 83. For changing 0×47 (or 0×40) of a recorded subcode to 0×07 (or 0×00), the recording units 95 and 96 generate control signals for changing the laser power to recording power. Laser light whose laser power has been changed to recording power is emitted from the optical pickup 83, thereby recording payloads, i.e., UDI, as shown in FIG. 11, in a UDI area.

The configuration shown in FIG. 13 can be changed depending on whether the one entire frame of 98 bits is to be recorded or a portion thereof is to be recorded by pre-pressing. In addition, when the UDI area is fixed at a position, since a position onto which pre-recording is to be performed and the arrangement of a recordable area can be known, recording can be performed by looking at a played-back subcode (time code), determining a recording position, and recording data at the determined position.

In a second example in the present invention, UDI is recorded at a fixed position on a disc. An area in which UDI is recorded will be refereed to as a "UDI area". When a method for additional recording by rotating a disc is employed, in the same manner as mastering, to record UDI in substantially an entire program area on a disc, time required for recording is extended. Thus, a UDI area is provided in, for example, the front portion of the program area and UDI is recorded thereinto. When there is no need to consider the time required for a recording process, for example, when high-speed recording is possible, such a restriction may be ignored and UDI may be recorded on the entire surface of a disc.

In the CD format, a ratio with respect to subcode Q-channels is specified. Thus, as described above, mode-1 subcodes must be included in 9 subcode frames or more out of any 10 consecutive subcode frames on a disc. With respect to the subcodes of mode 2 and 3, other than mode 1, it is specified that they need to be in at least one subcode in 100 consecutive subcode frames.

Figure 14:
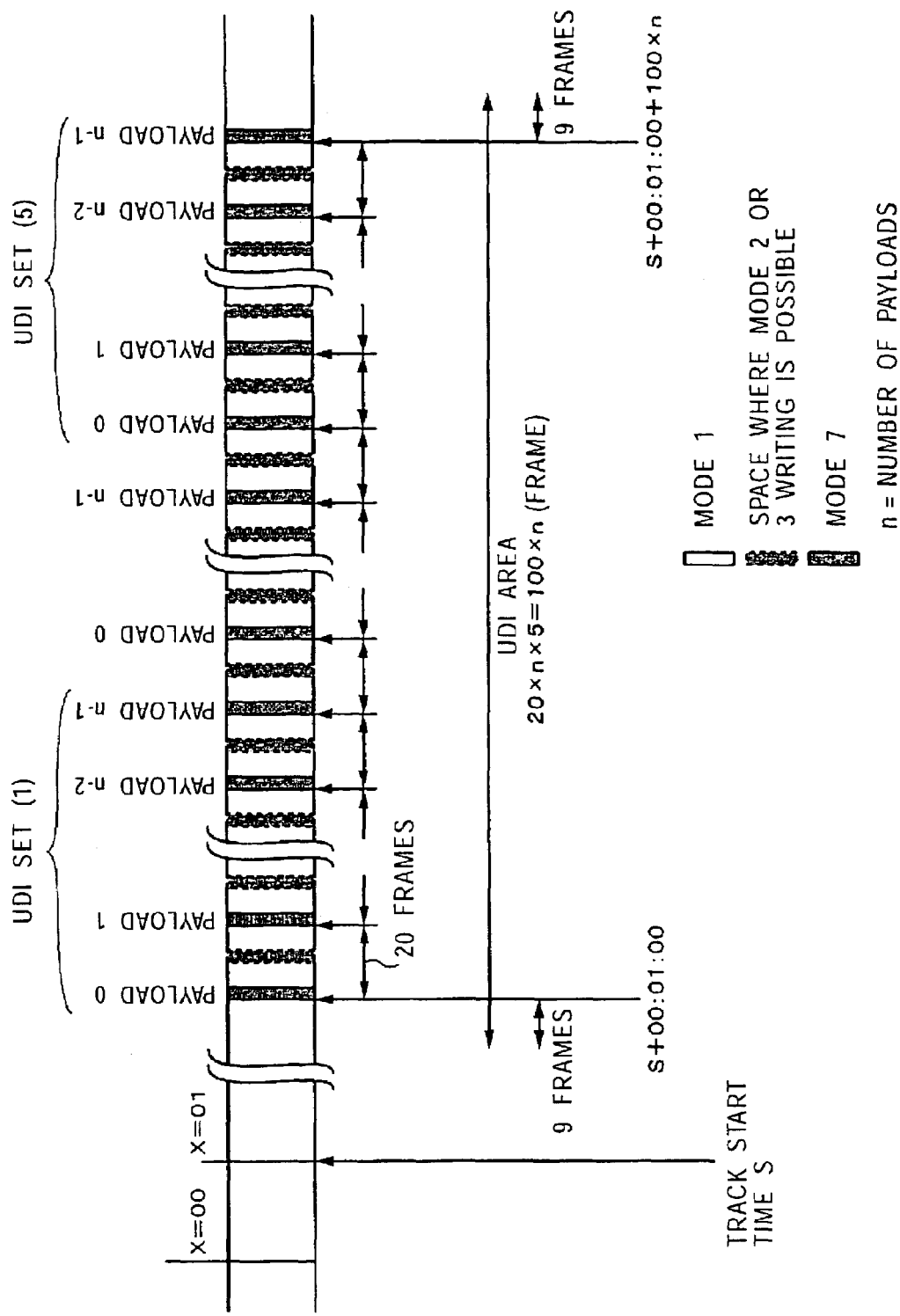
FIG. 14 is a schematic block diagram illustrating a second example of the layout of the UDI area.

A description will now be given for a method for recording UDI at a fixed position while satisfying such a ratio. FIG. 14 shows an example of the recording layout of UDI, the UDI is a mode-7 subcode as in the first embodiment described above. A payload in the format shown in FIG. 7A represents main data of 64 bits (or 72 bits) of UDI. Additionally, since UDI does not necessarily have to be configured by one payload, as shown in FIG. 14, a UDI set consisting of n payloads (n=1, 2, 3, . . . ) is used as the units of UDI data. For example, when UDI is data of 192 bits, the data is divided into three payloads, that is, 64-bit payload 0, 64-bit payload 1, and 64-bit payload 2.

In FIG. 14, when the track start time is S, payloads are arranged at positions "S+00(min):01(sec):00(frame); S+00: 01:20, . . ." at an interval of 20 frames (i.e. subcode frames). Mode-2 or -3 subcodes can be recorded in areas "S+00(min): 01(sec):10(frame); S+00:01:30, . . . ". Mode-1 subcodes are recorded in 9 subcode frames before the recording area of the first payload and 9 subcode frames after the recording area of the last payload. In the UDI area, mode-1 subcodes are recorded in areas other than the areas for payloads (mode 7) and modes 2 or 3 subcodes. Multiple recording is performed for providing a measure against errors. In the example of FIG. 14, a UDI set is recorded five times. Thus, the length of the UDI area is given by the expression:

$$20 \times n \times 5 = 100n \text{ (subcode frames).}$$

Figure 15:
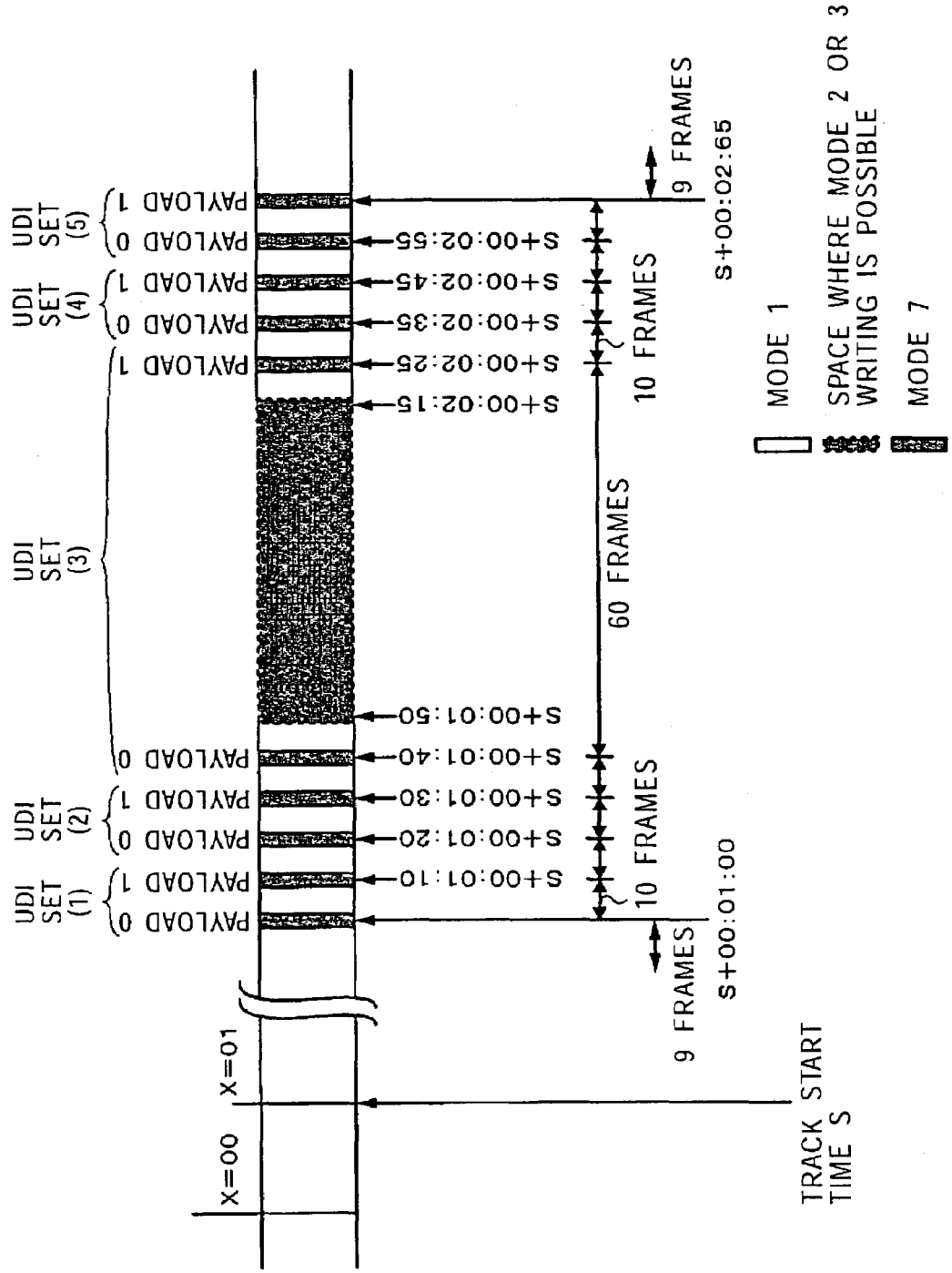
FIG. 15 is a schematic block diagram illustrating a third example of the layout of the UDI area.

FIG. 15 shows a second example of the recording layout of UDI. Each UDI set includes two payloads (payload 0 and payload 1). Each payload is recorded five times at an interval of 10 subcode frames. A mode-2 or -3 subcode can be recorded in an area from a position "S+00:01:50", which is subsequent the end of the payload 0 recording area (S+00: 01:40) in the third UDI set, to a position "S+00:02:15". Payload 1 contained in the third UDI set is recorded at a position "S+00:02:25". Thus, the two payloads of the third UDI set are recorded at an interval of 60 frames. Subsequent thereto, the UDI set is recorded twice at an interval of 10 subcode frames.

Mode-1 subcodes are recorded in areas other than the 9 frames before and after the payload area (i.e., a total of 18 frames), the recording areas of payloads in the UDI area, and the recording areas of mode-2 or -3 subcodes. Even within the area (60 subcode frames) in which mode-2 or 3 subcodes can be recorded, recording is performed so that mode-1 subcodes satisfy the ratio rule.

Figure 16:
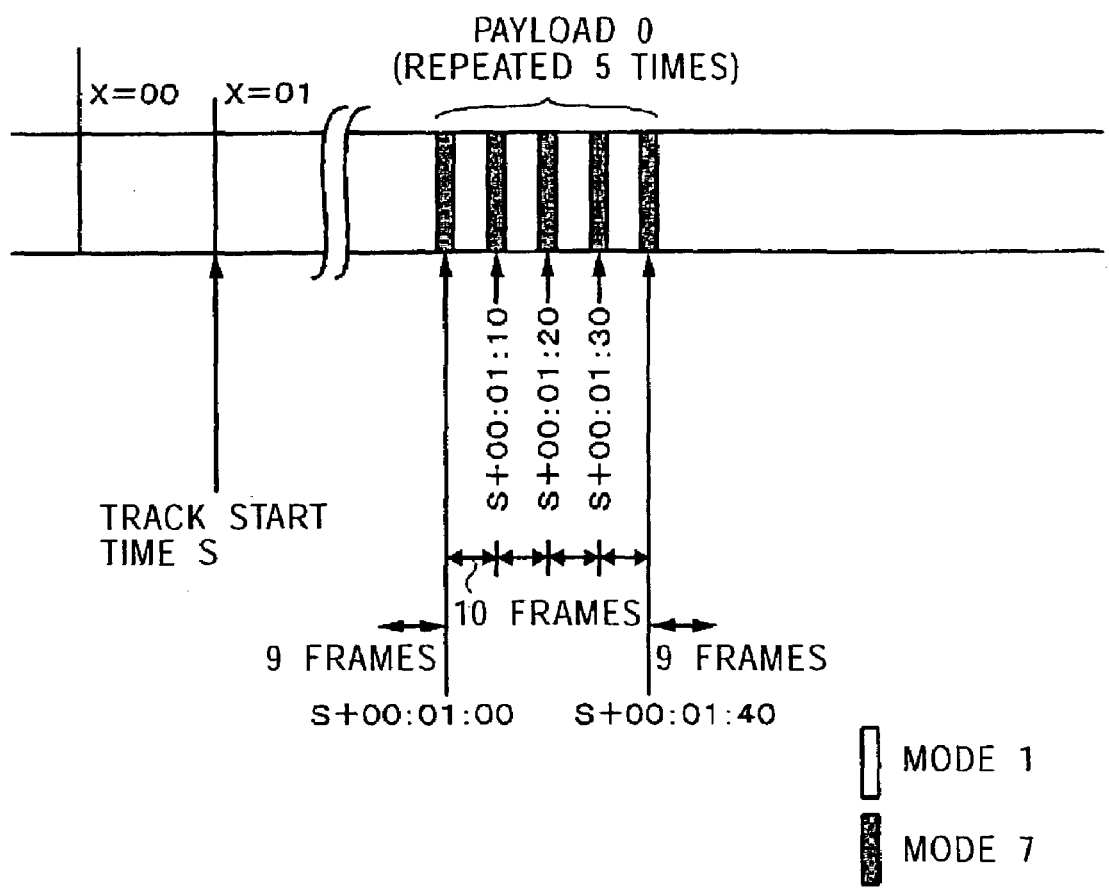
FIG. 16 is a schematic block diagram illustrating a fourth example of the layout of the UDI area.

FIG. 16 shows a third example of the recording layout of UDI, in which one payload set contains one type of payload 0. In this case, the payload set consists of payload 0. Payload 0 is recorded five times at an interval of 10 subcode frames. Mode-1 subcodes are recorded in areas other than the 9 frames before and after the payload area (i.e., a total of 18 frames) and the recording areas of payload 0 in the UDI areas. In the example of FIG. 16, since the overall length of the UDI area is short, there is no need to provide an area in which a mode-2 or 3 subcode can be recorded.

Figure 17:
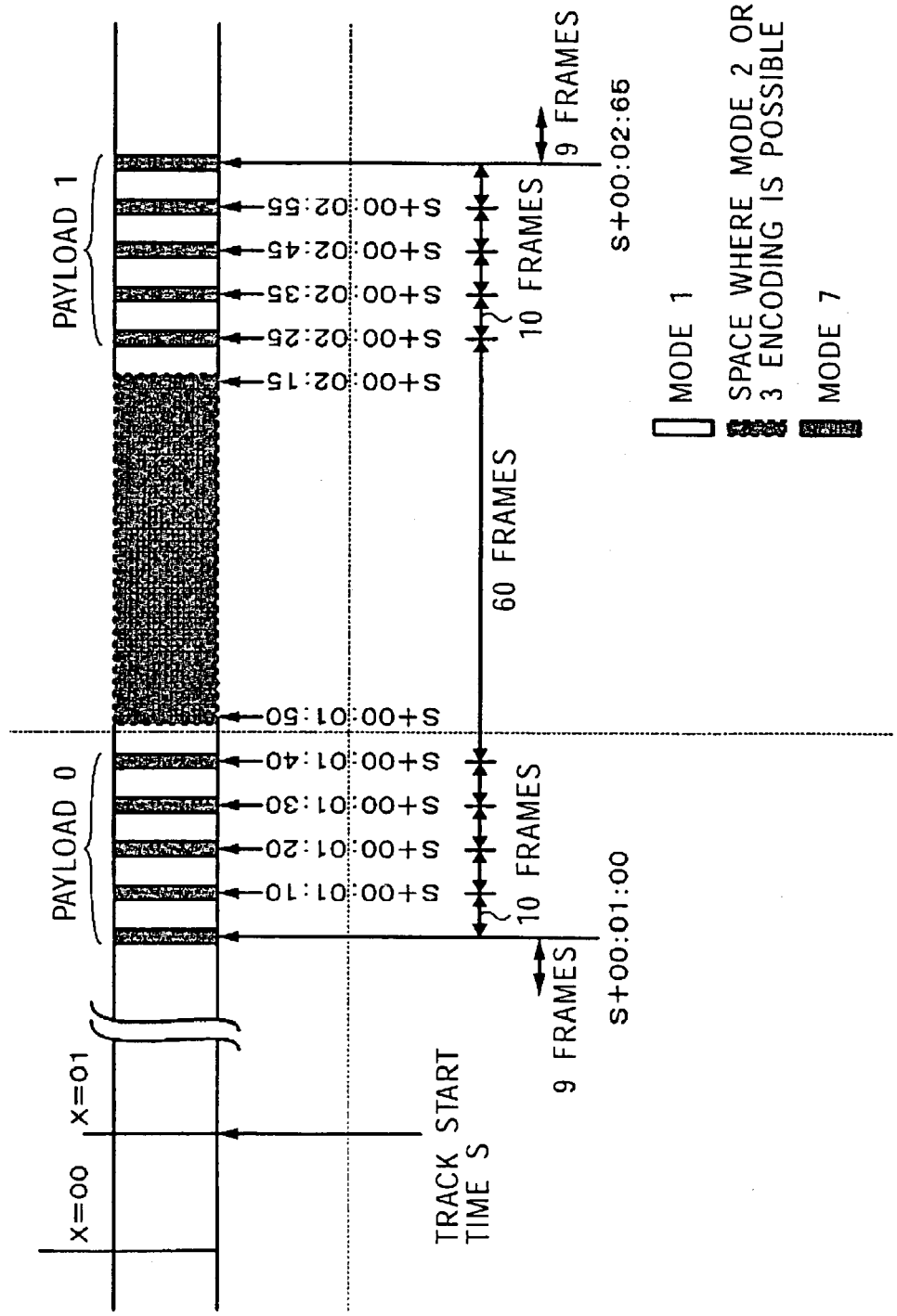
FIG. 17 is a schematic block diagram illustrating a fifth example of the layout of the UDI area.

FIG. 17 shows a fourth example of the recording layout of UDI. In the example of FIG. 15, two payloads (payload 0 and payload 1) that constitute a UDI set are arranged adjacent to each other. In contrast, in the example of FIG. 17, five payloads 0 and five payloads 1 are separately arranged in two different areas. The arrangement shown in FIG. 17 can facilitate additional recording of a certain payload within a UDI set. Similarly to the configuration shown in FIG. 11, payloads are arranged at an interval of 10 subcodes and an area in which mode-2 or -3 subcode can be recorded is also arranged in the center.

Numeric values in the subcode frames in the above-described recording layout are merely examples, and various numeric values can be used. For example, the interval at which payloads are arranged may be set to 11 subcode frames, 12 subcode frames, or the like. Even in such a case, the ratio of included mode-1 subcodes must satisfy the standard. The ratio rule for mode 1 cannot be violated since mode 1 is high in order of importance compared to either mode 2 or 3; however, the ratio rule for mode 2 or 3 may not be satisfied in some cases. For example, an area into which mode 2 or 3 can be recorded may be omitted in the example of FIG. 15 or 17.

Figure 18:
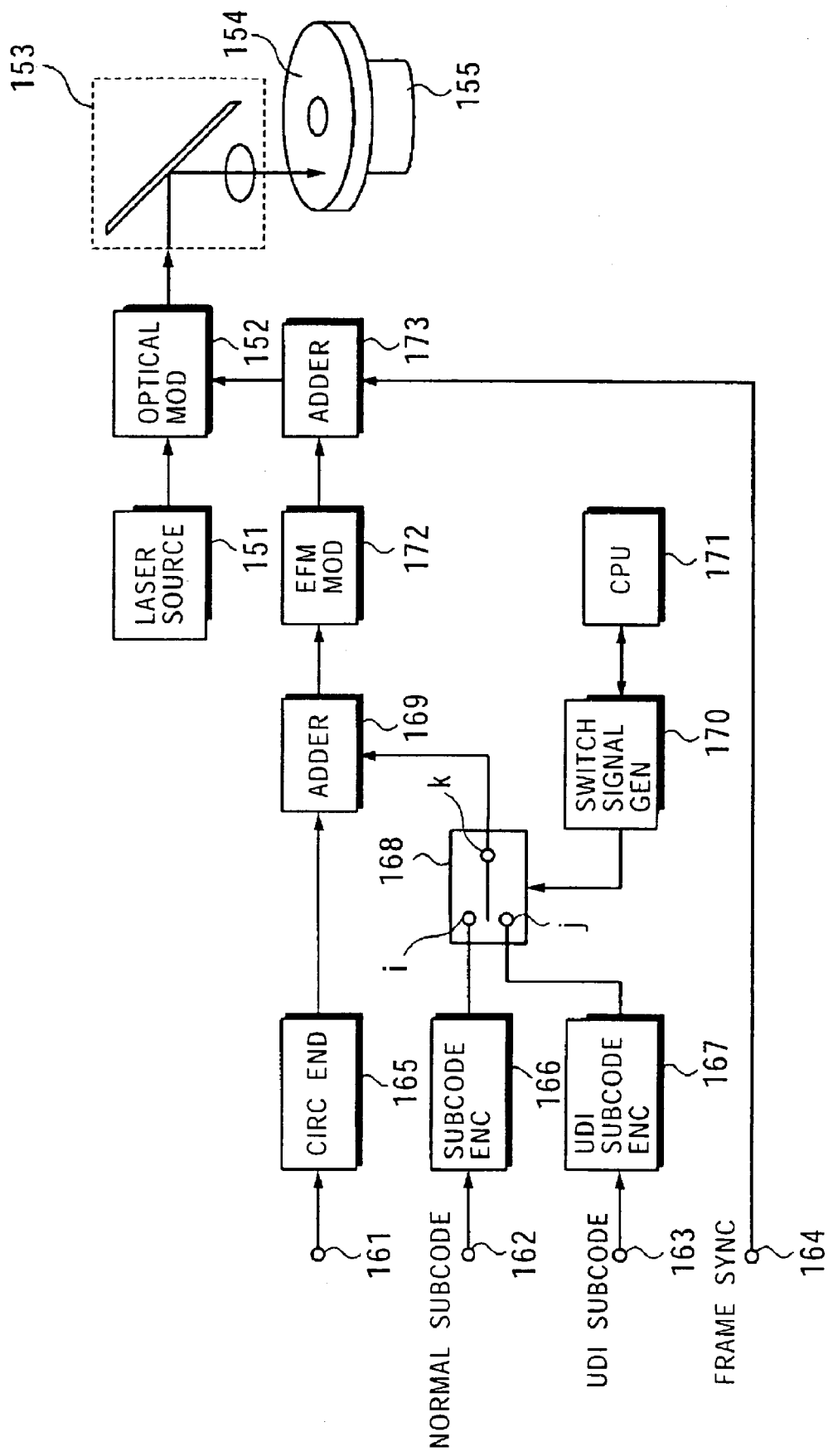
FIG. 18 is a block diagram showing another example of the configuration of a mastering apparatus according to the present invention.

FIG. 18 shows an example of the configuration of a mastering apparatus for creating a data-recording medium according to the present invention. The mastering apparatus includes a laser light source 151, an optical modulator 152, and an optical pickup 153. The laser light source 151 is, for example, a semiconductor laser or a gas laser, such as an Ar ion laser, He-Cd laser, or Kr ion laser. The optical modulator 152 is an acoustic-optical-effect type or electro-optical type modulator and modulates laser light that is emitted from the laser light source 151. The optical pickup 153 converges laser light that has passed through the optical modulator 152, and has an objective lens or the like for irradiating the photoresist surface of a disc-shaped glass base-plate 154 to which photo-sensitive material, i.e., a photoresist, is applied.

The optical modulator 152 modulates laser light from the laser light source 151 in accordance with a recording signal. The mastering apparatus creates a master on which data is recorded, by radiating the modulated laser light onto the glass base-plate 154. The mastering apparatus is further provided with a servo circuit (not shown) for controlling the focus so that a fixed distance between the optical pickup 153 and the glass base-plate 154 is maintained and for controlling the operation of driving and rotating a spindle motor 155. The spindle motor 155 rotates the glass base-plate 154.

A recording signal from an adder 173 is supplied to the optical modulator 152. Main digital data to be recorded is supplied from an input terminal 161. The main digital data has, for example, a CD-ROM data format. Channel P-W subcodes (hereinafter referred to as "normal subcodes") in accordance with a current CD standard are supplied from an input terminal 162. The normal subcodes includes not only mode-1 subcodes but also mode-2 and -3 subcodes. A UDI subcode is supplied from an input terminal 163. As described above, the UDI subcode is data of "0×47" or "×07". A frame sync is supplied from an input terminal 164.

The main digital data is supplied to a CIRC (Cross Interleaved Read-Solomon Code) encoder 165, and is subjected to scrambling and error correction encoding for adding, for example, parity data for error correction. That is, 16 bits of one sample or one word is divided into a higher-order 8-bit portion and a lower-order 8-bit portion, each portion being represented by a symbol. For each symbol, the scrambling and error correction encoding are performed.

The normal subcodes from the input terminal 162 are converted by a subcode encoder 166 into subcodes having the above-described subcode frame format, and are supplied to one input terminal i of a switch circuit 168. The UDI subcodes from the input terminal 163 are converted by a subcode encoder 167 into UDI having the above-described UDI frame format and are supplied to another input terminal j of the switch circuit 168. At the stage of mastering, the UDI subcodes each have a symbol "0×47" or "040".

The main data from the CIRC encoder 165 and the subcodes or UDI from an output terminal k of the switch circuit 168 are added by an adder 169. The switch circuit 168 is controlled in accordance with a switch signal from a switch-signal generator 170. The switch-signal generator 170 generates a switch signal in accordance with an instruction signal from a controller 171 (shown as a CPU in FIG. 18) for controlling the entire mastering apparatus. As described above, a UDI area is fixed on a disc, and UDI data (mode 7 subcodes) is also recorded at a fixed position in the UDI area. Thus, in a frame into which UDI data is to be recorded, the switch circuit 168 can select the input terminal j, and in a frame into which a mode 1, 2, or 3 subcode, other than UDI data, is to be recorded, the switch circuit 168 can select the input terminal i.

An output from the adder 169 is supplied to an EFM modulator 172, in which an 8-bit symbol is converted into 14 channel-bit data in accordance with a conversion table. An output from the EFM modulator 172 is supplied to the adder 173. The frame sync from the input terminal 164 is supplied to the adder 173, from which a recording signal having the above-described frame format is generated. The recording signal is supplied to the optical modulator 152, and the photoresist on the glass base-plate 154 is exposed to the laser light modulated by the optical modulator 152. The glass base-plate 154 onto which recording is performed in this manner is developed and is subjected to an electroforming process to create a metal master. Mother discs are then created from the metal master. Thereafter, stampers are created from the mother discs. Next, optical discs are created from the stampers by using compression molding, injection molding, or the like. The optical discs are similar to typical CDs, but material for the reflective layer is selected so that UDI can be additionally recorded, as described below.

Figure 19:
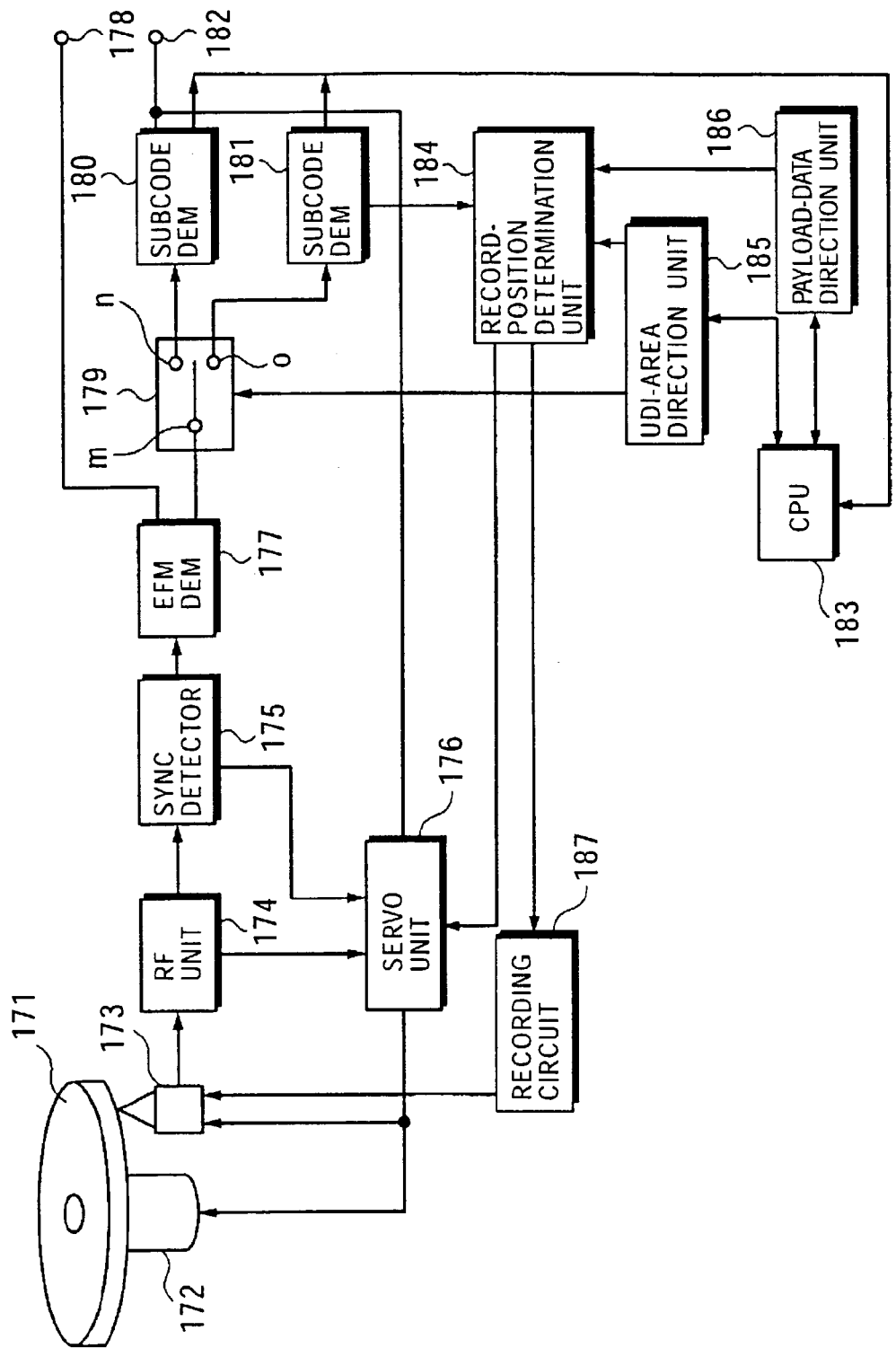
FIG. 19 is a block diagram showing an example of the configuration of a UDI recording apparatus.

FIG. 19 shows an example of the configuration of a record/playback apparatus for additionally recording UDI onto an optical disc that is created by the above-described mastering and stamping. Reference numeral. 171 indicates a created disc. Reference numeral 172 indicates a spindle motor for rotating the disc 171. Reference numeral 173 indicates an optical pickup for playing back signals recorded on the disc 171 and for recording UDI thereonto. The optical pickup 173 includes a semiconductor laser for radiating laser light onto the disc 171; an optical system, including an objective lens; a photo-detector for receiving light that has reflected from the disc 171; a focusing mechanism, and a tracking mechanism. The output level of laser light, i.e., laser power, is switched between the time of recording and the time of non-recording. During recording, laser light having power required for causing a change in the refractive index of the reflective film is used, and during non-recording, for example, during playback, laser light having power that is required for reading information recorded on the disc 171, i.e., power that is lower than that for recording, is used. The optical pickup 173 is also moved by a sled mechanism (not shown) in the radial direction of the disc 171.

Output signals from, for example, four photo-detecting elements of the optical pickup 173 are supplied to an RF unit 174. The RF unit 174 generates a playback (RF) signal, a focus error signal, and a tracking error signal, by calculating the output signal from each photo-detecting element. The playback signal is supplied to a frame-sync detector 175. The frame-sync detector 175 detects a frame sync appended to the head of each frame. The detected frame sync, and a focus error signal and a tracking error signal which are generated by the RF unit 174 are supplied to a servo circuit 176. In accordance with an RF-signal playback clock, the servo circuit 176 controls the rotational operation of the spindle motor 172, and controls the focus servo and tracking servo of the optical pickup 173.

Main data output from the frame-sync detector 175 is supplied to an EFM demodulator 177, and is subjected to EFM demodulation processing. Main digital data from the EFM demodulator 177 is extracted at an output terminal 178. Subcode data from the EFM demodulator 177 is supplied to an input terminal m of a switch circuit 179. The switch circuit 179 has two output terminals n and o. A played-back normal subcode is supplied from one output terminal b to a subcode demodulator 180, and a subcode played back from a UDI area is supplied from the other output terminal o to a subcode demodulator 181.

The subcode demodulator 180 demodulates normal subcodes recorded in areas other than a UDI area. In addition, the subcode demodulator 180 outputs a played-back subcode to an output terminal 182, and also supplies the played-back subcode to a controller 183 (shown as a CPU in FIG. 19) for controlling the entire UDI recording apparatus. This allows the controller 183 to know the current reading position. The subcode demodulator 181 demodulates subcodes in a UDI area. As described above, normal subcodes and mode-7 subcodes are recorded in a UDI area. The type of modes is identified from an address provided in the frame of each subcode, and a normal subcode is modulated and a mode-7 subcode is not modulated.

A playback subcode corresponding to a normal subcode from the subcode demodulator 181 is supplied to the controller 183. The subcode demodulator 181 identifies between the mode (mode 1, 2, or 3) of a normal subcode and mode 7 for UDI, and supplies the result thereof to a record-position determination unit 184.

The switch circuit 179 is switched in accordance with a switch signal from a UDI-area direction unit 185. The UDI-area direction unit 185 generates the switch signal in accordance with an instruction signal from the controller 183 for controlling the entire UDI recording apparatus. An instruction signal from the UDI-area direction unit 185 is supplied to a record-position determination unit 184. Further, an instruction signal from a payload-data direction unit 186 is supplied to the record-position determination unit 184.

The record-position determination unit 184 determines a position (spot) on which additional recording is required, the position being located at a position where mode-7 subcode can be recorded in a UDI area. The initial value of a mode-7 subcode is set to "1" (see FIGS. 10A and 10B) on the disc created by mastering. Only a case in which payload data is "0" requires recording operation that involves irradiation with laser light having recording power. Control data for changing the laser power to recording power is supplied from the record-position determination unit 184 to a recording circuit 187. In response to the control signal, the recording circuit 187 increases the laser power at a predetermined spot (see FIG. 9) and records data in which UDI data (a subcode Q-channel) is "0". Further, the payload-data direction unit 186 generates a control signal for recording a CRC concerning the UDI data, so that a CRC for error detection is recorded. Payloads, i.e., UDI data, are additionally recorded in accordance with one of the layouts shown in FIGS. 14 to 17.

The present invention is not limited to the embodiment described above, and various applications and modifications are possible without departing from the scope and spirit of the present invention. For example, when a UDI set includes common information between discs in addition to data for identifying each disc, such common information may be recorded in advance by mastering. In addition, a UDI index may be recorded by mastering. Additionally, UDI may be recorded in the lead-in area rather than in a program area of a disc.

The present invention can also be applicable to multi-session optical discs for recording data, for example, in a CD-DA format and a CD-ROM format. As information recorded onto an optical disc, various types of data are available, such as audio data, video data, still-image data, character data, computer graphic data, game software, and computer programs. Thus, the present invention can be applied to, for example, DVD videodiscs and DVD-ROM discs. Additionally, the present invention can be applied to not only disc-shaped data recording media but to card-shaped media.

What is claimed is:

1. A recording method for a recording medium, the recording medium having a substrate on which first data and second data are recorded as a protrusion/depression pattern in advance and a reflective layer that is provided on a surface of the protrusion/depression pattern, the method comprising:

changing the reflective properties of an area of the protrusion/depression pattern of the second data by irradiating the reflective layer with laser light; and additionally recording third data to the reflective layer, which is used for identifying the recording medium, at a predetermined position on the recording medium, wherein the protrusion/depression pattern comprises pits and lands, and the third data is additionally recorded by changing the lands of the second data to pits.

* * * * *